(12) United States Patent
Kanada et al.

(10) Patent No.: US 10,343,220 B2
(45) Date of Patent: Jul. 9, 2019

(54) METHOD FOR MANUFACTURING MACHINE COMPONENT, APPARATUS FOR MANUFACTURING MACHINE COMPONENT, METHOD FOR MACHINING ROTATION SYMMETRY PLANE, RECORDING MEDIUM, AND PROGRAM

(71) Applicants: SUMITOMO ELECTRIC HARDMETAL CORP., Itami-shi (JP); Sumitomo Electric Industries, Ltd., Osaka-shi (JP); Sumitomo Electric Tool Net, Inc., Osaka-shi (JP)

(72) Inventors: Yasuyuki Kanada, Itami (JP); Kunishige Tanaka, Itami (JP); Soichiro Okumura, Itami (JP); Jun Okamoto, Osaka (JP); Futoshi Takeshita, Osaka (JP)

(73) Assignees: SUMITOMO ELECTRIC HARDMETAL CORP., Itami-shi (JP); Sumitomo Electric Industries, Ltd., Osaka-shi (JP); Sumitomo electric Tool Net, Inc., Oaka-shi (JP)

( * ) Notice: Subject to any disclaimer, the term of this patent is extended or adjusted under 35 U.S.C. 154(b) by 0 days.

(21) Appl. No.: 15/542,185

(22) PCT Filed: Dec. 16, 2015

(86) PCT No.: PCT/JP2015/085197
§ 371 (c)(1),
(2) Date: Jul. 7, 2017

(87) PCT Pub. No.: WO2016/114058
PCT Pub. Date: Jul. 21, 2016

(65) Prior Publication Data
US 2018/0257145 A1    Sep. 13, 2018

(30) Foreign Application Priority Data

Jan. 16, 2015    (JP) ............................... 2015-007115
Apr. 27, 2015    (JP) ............................... 2015-090385

(51) Int. Cl.
     *B23B 1/00*      (2006.01)
     *B23B 5/38*      (2006.01)
     *G05B 19/4093*      (2006.01)

(52) U.S. Cl.
CPC ................. *B23B 1/00* (2013.01); *B23B 5/38* (2013.01); *G05B 19/4093* (2013.01);
(Continued)

(58) Field of Classification Search
CPC ......... B23B 1/00; B23B 5/38; G05B 19/4093; G05B 2219/49193
See application file for complete search history.

(56) References Cited

U.S. PATENT DOCUMENTS

2003/0089204 A1    5/2003    Schreiber et al.
2005/0076754 A1    4/2005    Schreiber et al.

FOREIGN PATENT DOCUMENTS

WO      01/43902 A2    6/2001
WO      03/022497 A1    3/2003

*Primary Examiner* — Alan Snyder
(74) *Attorney, Agent, or Firm* — Baker Botts L.L.P.; Michael A. Sartori

(57) ABSTRACT

A method includes positioning a linear cutting edge inclined at an angle greater than 0° and smaller than 90° with respect to a Z axis at a cutting start position displaced from a position on an X axis along a direction of a Y axis in a three-dimensional orthogonal coordinate system in which an axial line of rotation of a rotation symmetry plane is defined as the Z axis, an axis in a radial direction of the rotation symmetry plane is defined as the X axis, and an axis orthogonal to both of the Z axis and the X axis is defined as the Y axis and machining the rotation symmetry plane by (Continued)

feeding the cutting edge from the cutting start position along a track having an X axis component, a Y axis component, and a Z axis component while the cutting edge is in contact with a rotating machine component.

7 Claims, 29 Drawing Sheets

(52) U.S. Cl.
    CPC ............... *G05B 19/40937* (2013.01); *G05B 2219/49193* (2013.01); *G05B 2219/49343* (2013.01)

DIRECTION OF RADIUS R

FIG.33

| | β SMALL | β GREAT |
|---|---|---|
| PROJECTED IMAGE OF CUTTING EDGE ON RZ PLANE | | |
| CONTACT RESISTANCE | HIGH | LOW |
| SURFACE ROUGHNESS | SMALL | GREAT |
| CUT SURFACE | | |

DIRECTION OF HEIGHT Z

DIRECTION OF HEIGHT Z

METHOD FOR MANUFACTURING MACHINE COMPONENT, APPARATUS FOR MANUFACTURING MACHINE COMPONENT, METHOD FOR MACHINING ROTATION SYMMETRY PLANE, RECORDING MEDIUM, AND PROGRAM

TECHNICAL FIELD

The present invention relates to a method for manufacturing a machine component, an apparatus for manufacturing a machine component, a method for machining a rotation symmetry plane, a recording medium having a program for a manufacturing method recorded thereon, and the program.

BACKGROUND ART

A method of cutting and machining an object with a tool of which cutting edge is set obliquely to an axial line of rotation has been proposed. International Publication No. 2001/043902 (PTD 1) and International Publication No. 2003/022497 (PTD 2) disclose a method of machining a workpiece with a linear cutting edge. The cutting edge is set as being inclined with respect to a direction of feed and fed in a direction transverse to an axial line of rotation of the workpiece. With this machining method, a surface of the workpiece can be machined to be smooth and highly efficient machining can be achieved.

CITATION LIST

Patent Document

PTD 1: International Publication No. 2001/043902
PTD 2: International Publication No. 2003/022497

SUMMARY OF INVENTION

Technical Problem

A cone or a frustum represents a rotation symmetry object of which ridgeline forms a constant angle greater than 0° and smaller than 90° with respect to an axial line of rotation. A columnar shape (including a cylindrical shape) represents a rotation symmetry object of which ridgeline forms an angle of 0° with respect to an axial line of rotation. Some of various machine components have such a rotation symmetry plane.

In general, higher accuracy in dimension of a machine component is more preferred. Therefore, highly accurate machining of a rotation symmetry plane of a machine component such that a ridgeline forms an accurate angle (for example, an angle as designed) with respect to an axial line of rotation or a rotation symmetry plane may be required.

Neither of International Publication No. 2001/043902 and International Publication No. 2003/022497, however, discloses a machining method for enhancing accuracy of an angle formed by a ridgeline of a surface of a cone or a surface of a frustum with respect to the axial line of rotation or the rotation symmetry plane. In many of objects to be machined in a columnar shape, a length in a direction of the axial line of rotation is longer than a length of a radius. In order to highly accurately manufacture a machine component longer in the direction of the axial line of rotation in accordance with the method above, a cutting edge should be moved along an appropriate track.

An object of the present invention is to provide a manufacturing method, a manufacturing apparatus, a manufacturing apparatus, a method for machining a rotation symmetry plane, a computer readable recording medium, and a program for accurately manufacturing a machine component having a rotation symmetry plane of which ridgeline is at a constant angle not smaller than 0° and smaller than 90° with respect to an axial line of rotation.

Solution to Problem

A method for manufacturing a machine component according to one manner of the present invention is a method for manufacturing a machine component having a rotation symmetry plane defined by a ridgeline inclined at an angle greater than 0° and smaller than 90° with respect to an axial line of rotation. The method includes, in a three-dimensional orthogonal coordinate system in which the axial line of rotation of the rotation symmetry plane is defined as a Z axis, an axis in a radial direction of the rotation symmetry plane is defined as an X axis, and an axis orthogonal to both of the Z axis and the X axis is defined as a Y axis, positioning a linear cutting edge inclined at an angle greater than 0° and smaller than 90° with respect to the Z axis at a cutting start position displaced from a position on the X axis along a direction of the Y axis and machining the rotation symmetry plane by feeding the cutting edge from the cutting start position along a track having an X axis component, a Y axis component, and a Z axis component while the cutting edge is in contact with the rotating machine component.

A method for manufacturing a machine component according to one manner of the present invention is a method for manufacturing a machine component having a rotation symmetry plane defined by a generatrix in parallel to an axial line of rotation. The method includes, in a three-dimensional orthogonal coordinate system in which the axial line of rotation is defined as a Z axis, an axis in a radial direction of the rotation symmetry plane is defined as an X axis, and an axis orthogonal to both of the Z axis and the X axis is defined as a Y axis, positioning a linear cutting edge at a cutting start position as being inclined with respect to the Z axis at a first inclination angle greater than 0° and smaller than 90° on a YZ plane and machining the rotation symmetry plane by feeding the cutting edge from the cutting start position with the cutting edge being in contact with the rotating machine component such that different portions of the cutting edge are successively in contact. The cutting start position includes an X axis coordinate and a Y axis coordinate. Each of the X axis coordinate and the Y axis coordinate is determined based on the first inclination angle and a second inclination angle formed by the cutting edge with respect to the Z axis on an XZ plane.

Advantageous Effects of Invention

According to the above, a machine component having a rotation symmetry plane of which ridgeline forms a constant angle not smaller than 0° and smaller than 90° with respect to an axial line of rotation can accurately be manufactured.

BRIEF DESCRIPTION OF DRAWINGS

FIG. 33 is a diagram for illustrating an angle of the cutting edge on the YZ plane.

DESCRIPTION OF EMBODIMENTS

[Description of Embodiments of Present Invention]

Figure 1:
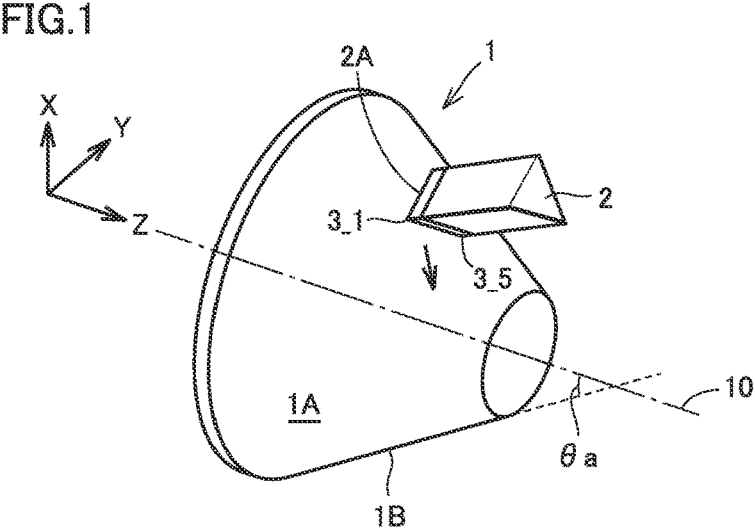
FIG. 1 is a perspective view showing a manufacturing method according to a first embodiment of the present invention.

Embodiments of the present invention will initially be listed and described.

(1) A method for manufacturing a machine component according to one manner of the present invention is a method for manufacturing a machine component (1) having a rotation symmetry plane (1A) defined by a ridgeline (1B) inclined at an angle greater than 0° and smaller than 90° with respect to an axial line of rotation (10). The method includes, in a three-dimensional orthogonal coordinate system in which the axial line of rotation (10) of the rotation symmetry plane (1A) is defined as the Z axis, an axis in a radial direction of the rotation symmetry plane (1A) is defined as an X axis, and an axis orthogonal to both of the Z axis and the X axis is defined as a Y axis, positioning a linear cutting edge (2A) inclined at an angle greater than 0° and smaller than 90° with respect to the Z axis at a cutting start position displaced from a position on the X axis along a direction of the Y axis (S41) and machining the rotation symmetry plane (1A) by feeding the cutting edge (2A) from the cutting start position along a track having an X axis component, a Y axis component, and a Z axis component while the cutting edge is in contact with the rotating machine component (S42).

According to the above, a machine component having a rotation symmetry plane of which ridgeline forms a constant angle greater than 0° and smaller than 90° with respect to an axial line of rotation can accurately be manufactured. The cutting start position is displaced from a position on the X axis along the direction of the Y axis. Even when an inclination angle of the cutting edge with respect to the Z axis or the XY plane is different from a target angle, the cutting edge can be fed at the target angle with respect to the Z axis by appropriately determining an amount of displacement in the direction of the Y axis and the track. Therefore, the machine component can accurately be manufactured.

The rotation symmetry plane is machined by feeding the cutting edge (2A) inclined at an angle greater than 0° and smaller than 90° with respect to the Z axis. Machining excellent in surface roughness and efficiency can thus be realized. In this aspect as well, a machine component can accurately be manufactured.

The X axis component, the Y axis component, and the Z axis component are all different from 0. The cutting edge has an amount of movement in directions of all of the X axis, the Y axis, and the Z axis between the cutting start position and a cutting end position. A direction of the track of the cutting edge is a direction transverse to each of the X axis, the Y axis, and the Z axis.

The method can include other steps in addition to machining of the rotation symmetry plane above.

(2) Preferably, at the cutting start position, a first end portion (3_1) of the cutting edge (2A) is in contact with the machine component (1). While the cutting edge (2A) is fed along the track from the cutting start position to a cutting end position, different portions of the cutting edge (2A) between the first end portion (3_1) of the cutting edge (2A) and a second end portion (3_5) of the cutting edge (2A) located opposite to the first end portion (3_1) are successively in contact.

According to the above, the rotation symmetry plane is machined by using the whole cutting edge (2A). Therefore, lifetime of the cutting edge can be longer.

(3) Preferably, the method further includes calculating the cutting start position and the track from a length (L) of the cutting edge (2A), a first inclination angle (θ) formed by the cutting edge (2A) with respect to the X axis in an XZ plane, a second inclination angle (β) formed by the cutting edge (2) with respect to the X axis in an XY plane, a maximum radius ($R_{max}$) of the rotation symmetry plane (1A), a minimum radius ($R_{min}$) of the rotation symmetry plane (1A), and a target angle ($θ_S$) formed by the ridgeline (1B) with respect to the X axis in the XZ plane (S30).

According to the above, the cutting edge can be fed at a target angle with respect to the Z axis. Therefore, the machine component can accurately be manufactured.

(4) Preferably, a coordinate of the cutting start position is expressed as (X, Y, Z)=($R_{max}$, ΔY, $Z_{min}$) and the track is expressed as (X, Y, Z)=($R_{max}$−t, ΔY−t×tan $θ_1$', $Z_{min}$+t×tan $θ_0$'), where $R_{max}$ represents the maximum radius of the rotation symmetry plane (1A), $R_{min}$ represents the minimum radius of the rotation symmetry plane (1A), t represents a variable varying from 0 to $R_{max}$−$R_{min}$, and $θ_S$ represents the target angle, and ΔY, tan $θ_1$', and tan $θ_0$' satisfy expressions $$ΔY = R_{max} \sin φ$$

$$\tan θ'_1 = \tan(φ + γ)$$

$$\tan θ'_0 = \frac{\tan θ_s}{\cos φ - \sin φ \tan γ}$$

$$φ = \cos^{-1}\left(\cos β × \frac{\tan θ}{\tan θ_s}\right) - β$$

$$γ = \tan^{-1}\left(\frac{L_{XY} \sin(β + φ)}{R_{max} - R_{min} - L_{XY} \cos(β + φ)}\right)$$

$$L_{XY} = L\sqrt{\frac{1 + \tan^2 β}{1 + \tan^2 β + \tan^2 θ}}$$

where L represents a length of the cutting edge, θ represents the first inclination angle, and β represents the second inclination angle.

According to the above, the cutting edge can be fed at a target angle with respect to the Z axis. Therefore, the machine component can accurately be manufactured.

(5) A method for manufacturing a machine component according to one manner of the present invention is a method for manufacturing a machine component (1) having a rotation symmetry plane (1A) defined by a generatrix (1B) in parallel to an axial line of rotation (10). The method includes, in a three-dimensional orthogonal coordinate system in which the axial line of rotation (10) is defined as a Z axis, an axis in a radial direction of the rotation symmetry plane (1A) is defined as an X axis, and an axis orthogonal to both of the Z axis and the X axis is defined as a Y axis, positioning a linear cutting edge (2A) at a cutting start position as being inclined with respect to a Z axis at a first inclination angle (β) greater than 0° and smaller than 90° on a YZ plane and machining the rotation symmetry plane (1A) by feeding the cutting edge (2A) from the cutting start position with the cutting edge being in contact with the rotating machine component (1) such that different portions of the cutting edge (2A) are successively in contact. The cutting start position includes an X axis coordinate and a Y axis coordinate. Each of the X axis coordinate and the Y axis coordinate is determined based on the first inclination angle (β) and a second inclination angle ($\theta_{XZ}$) formed by the cutting edge (2A) with respect to the Z axis on an XZ plane.

According to the above, a machine component having a rotation symmetry plane defined by a generatrix in parallel to an axial line of rotation can highly accurately be machined. The linear cutting edge is inclined with respect to the Z axis at a first inclination angle greater than 0° and smaller than 90° on the YZ plane. In this state, the cutting edge is fed from the cutting start position such that different portions of the cutting edge are successively in contact. Thus, surface roughness of a machined surface can highly be accurate. An X coordinate and a Y coordinate of the cutting start position are determined based on the first inclination angle and the second inclination angle. Thus, the machine component can be manufactured such that a dimension in a radial direction of the machine component is highly accurate.

The "rotation symmetry plane defined by the generatrix in parallel to the axial line of rotation" includes a side surface of a column and a side surface of a cylinder. The generatrix in parallel to the axial line of rotation can also be defined as a ridgeline forming an angle of 0° with respect to the axial line of rotation.

(6) Preferably, the method further includes calculating a track of the cutting edge (2A) based on a length of the cutting edge (2A), the first inclination angle (β), the second inclination angle ($\theta_{XZ}$), a radius of the rotation symmetry plane (1A), and a Z axis coordinate of the rotation symmetry plane (1A).

According to the above, the machine component can be manufactured such that a dimension in a radial direction of the machine component is highly accurate.

(7) Preferably, the track is expressed as (X, Y, Z)=(R+ΔX−t×tan $\theta_1'$, ΔY−t×tan $\theta_2'$, $Z_{min}$+t), where R represents the radius of the rotation symmetry plane (1A), t represents a variable varying from 0 to $Z_{max}$−$Z_{min}$, $Z_{min}$ represents a minimum value of the Z axis coordinate of the rotation symmetry plane (1A), and $Z_{max}$ represents a maximum value of the Z axis coordinate of the rotation symmetry plane (1A). ΔX, ΔY, tan $\theta_1'$, and tan $\theta_2'$ satisfy expressions $$\Delta X = -R(1 - \cos\theta_{XY})$$

$$\Delta Y = -R \sin \theta_{XY}$$

$$\tan \theta_1' = \frac{L_{XZ} \sin \theta_{XZ}}{Z_{max} - Z_{min} - L_{XZ} \cos \theta_{XZ}}$$

$$\tan \theta_2' = \frac{L_{YZ} \sin \beta}{Z_{max} - Z_{min} - L_{YZ} \cos \beta}$$

where $$\tan \theta_{XY} = \frac{\tan \theta_{XZ}}{\tan \beta}$$

$$L_{YZ} = L\sqrt{\frac{1 + \tan^2 \beta}{1 + \tan^2 \theta_{XZ} + \tan^2 \beta}}$$

$$L_{XZ} = L\sqrt{\frac{1 + \tan^2 \theta_{XZ}}{1 + \tan^2 \theta_{XZ} + \tan^2 \beta}}$$

where β represents the first inclination angle, $\theta_{XZ}$ represents the second inclination angle, and L represents a length of the cutting edge (2A).

According to the above, the machine component can be manufactured such that a dimension in a radial direction of the machine component is highly accurate.

(8) Preferably, the cutting edge (2A) is held by a holder which prevents rotation of the cutting edge (2A).

According to the above, variation in inclination of the cutting edge (2A) during machining of the machine component can be prevented. Therefore, the machine component can accurately be manufactured.

(9) Preferably, the method further includes measuring the first and second inclination angles with a measurement instrument (S10).

According to the above, the cutting start position and the track can be calculated.

(10) Preferably, an apparatus for manufacturing a machine component is an apparatus with which the method described in any of (1) to (9) above is performed.

According to the above, the machine component can accurately be manufactured.

(11) A method for machining a rotation symmetry plane according to one manner of the present invention is a method for machining a rotation symmetry plane defined by a ridgeline inclined at an angle greater than 0° and smaller than 90° with respect to an axial line of rotation (10). The method includes, in a three-dimensional orthogonal coordinate system in which the axial line of rotation (10) of the rotation symmetry plane (1A) is defined as a Z axis, an axis in a radial direction of the rotation symmetry plane (1A) is defined as an X axis, and an axis orthogonal to both of the Z axis and the X axis is defined as a Y axis, positioning a linear cutting edge (2A) inclined at an angle greater than 0° and smaller than 90° with respect to the Z axis at a cutting start position displaced from a position on the X axis along a direction of the Y axis (S41) and machining the rotation symmetry plane (1A) by feeding the cutting edge (2A) from the cutting start position along a track having an X axis component, a Y axis component, and a Z axis component while the cutting edge is in contact with a rotating workpiece (1).

According to the above, a smooth rotation symmetry plane high in accuracy in angle formed by the ridgeline thereof with respect to the axial line of rotation or the XY plane can be machined.

(12) A recording medium according to one manner of the present invention is a computer readable recording medium having a program recorded thereon, the program being for manufacturing a machine component (1) having a rotation symmetry plane (1A) defined by a ridgeline (1B) inclined at an angle greater than 0° and smaller than 90° with respect to an axial line of rotation (10). The program causes the computer to perform receiving a length (L) of a linear cutting edge (2A), a first inclination angle (θ) formed by the cutting edge (2A) with respect to an X axis in an XZ plane, a second inclination angle (β) formed by the cutting edge (2) with respect to the X axis in an XY plane, a maximum radius ($R_{max}$) of the rotation symmetry plane (1A), a minimum radius ($R_{min}$) of the rotation symmetry plane (1A), and a target angle ($\theta_S$) formed by the ridgeline (1B) with respect to the X axis in the XZ plane in a three-dimensional orthogonal coordinate system in which the axial line of rotation (10) of the rotation symmetry plane (1A) is defined as a Z axis, an axis in a radial direction of the rotation symmetry plane (1A) is defined as the X axis, and an axis orthogonal to both of the Z axis and the X axis is defined as a Y axis, positioning the cutting edge (2A) inclined at an angle greater than 0° and smaller than 90° with respect to the Z axis at a cutting start position, and machining the rotation symmetry plane (1A) by feeding the cutting edge (2A) from the cutting start position along a track while the cutting edge is in contact with the rotating machine component (1). A coordinate of the cutting start position is expressed as (X, Y, Z)=($R_{max}$, $\Delta Y$, $Z_{min}$) and the track is expressed as (X, Y, Z)=($R_{max}$-t, $\Delta Y$-t×tan $\theta_1$', $Z_{min}$+t×tan $\theta_0$'), where $R_{max}$ represents the maximum radius of the rotation symmetry plane (1A), $R_{min}$ represents the minimum radius of the rotation symmetry plane (1A), t represents a variable varying from 0 to $R_{max}$-$R_{min}$, and $\theta_S$ represents the target angle. $\Delta Y$, tan $\theta_1$', and tan $\theta_0$' satisfy expressions $$\Delta Y = R_{max} \sin \phi$$

$$\tan \theta_1' = \tan(\phi + \gamma)$$

$$\tan \theta_0' = \frac{\tan \theta_s}{\cos \phi - \sin \phi \tan \gamma}$$

$$\phi = \cos^{-1}\left(\cos \beta \times \frac{\tan \theta}{\tan \theta_s}\right) - \beta$$

$$\gamma = \tan^{-1}\left(\frac{L_{XY} \sin(\beta + \phi)}{R_{max} - R_{min} - L_{XY} \cos(\beta + \phi)}\right)$$

$$L_{XY} = L\sqrt{\frac{1 + \tan^2 \beta}{1 + \tan^2 \beta + \tan^2 \theta}}$$

where L represents a length of the cutting edge, θ represents the first inclination angle, and β represents the second inclination angle.

According to the above, the machine component can accurately be manufactured.

(13) A program according to one manner of the present invention is a program for manufacturing a machine component (1) having a rotation symmetry plane (1A) defined by a ridgeline (1B) inclined at an angle greater than 0° and smaller than 90° with respect to an axial line of rotation (10). The program causes a computer to perform receiving a length (L) of a linear cutting edge (2A), a first inclination angle (θ) formed by the cutting edge (2A) with respect to an X axis in an XZ plane, a second inclination angle (β) formed by the cutting edge (2) with respect to the X axis in an XY plane, a maximum radius ($R_{max}$) of the rotation symmetry plane (1A), a minimum radius ($R_{min}$) of the rotation symmetry plane (1A), and a target angle ($\theta_S$) formed by the ridgeline (1B) with respect to the X axis in the XZ plane in a three-dimensional orthogonal coordinate system in which the axial line of rotation (10) of the rotation symmetry plane (1A) is defined as a Z axis, an axis in a radial direction of the rotation symmetry plane (1A) is defined as the X axis, and an axis orthogonal to both of the Z axis and the X axis is defined as a Y axis, positioning the cutting edge (2A) inclined at an angle greater than 0° and smaller than 90° with respect to the Z axis at a cutting start position, and machining the rotation symmetry plane (1A) by feeding the cutting edge (2A) from the cutting start position along a track while the cutting edge is in contact with the rotating machine component (1). A coordinate of the cutting start position is expressed as (X, Y, Z)=($R_{max}$, $\Delta Y$, $Z_{min}$) and the track is expressed as (X, Y, Z)=($R_{max}$-t, $\Delta Y$-t×tan $\theta_1$', $Z_{min}$+t×tan $\theta_0$'), where $R_{max}$ represents the maximum radius of the rotation symmetry plane (1A), $R_{min}$ represents the minimum radius of the rotation symmetry plane (1A), t represents a variable varying from 0 to $R_{max}$-$R_{min}$, and $\theta_S$ represents the target angle. $\Delta Y$, tan $\theta_1$', and tan $\theta_0$' satisfy expressions $$\Delta Y = R_{max} \sin \phi$$

$$\tan \theta_1' = \tan(\phi + \gamma)$$

$$\tan \theta_0' = \frac{\tan \theta_s}{\cos \phi - \sin \phi \tan \gamma}$$

$$\phi = \cos^{-1}\left(\cos \beta \times \frac{\tan \theta}{\tan \theta_s}\right) - \beta$$

$$\gamma = \tan^{-1}\left(\frac{L_{XY} \sin(\beta + \phi)}{R_{max} - R_{min} - L_{XY} \cos(\beta + \phi)}\right)$$

$$L_{XY} = L\sqrt{\frac{1 + \tan^2 \beta}{1 + \tan^2 \beta + \tan^2 \theta}}$$

where L represents a length of the cutting edge, θ represents the first inclination angle, and β represents the second inclination angle.

According to the above, the machine component can accurately be manufactured.

(14) A method for machining a rotation symmetry plane according to one manner of the present invention is a method for machining a rotation symmetry plane (1A) defined by a generatrix (1B) in parallel to an axial line of rotation (10). The method includes positioning a linear cutting edge (2A) at a cutting start position as being inclined with respect to a Z axis at a first inclination angle (β) greater than 0° and smaller than 90° on a YZ plane in a three-dimensional orthogonal coordinate system in which the axial line of rotation (10) is defined as the Z axis, an axis in a radial direction of the rotation symmetry plane (1A) is defined as an X axis, and an axis orthogonal to both of the Z axis and the X axis is defined as a Y axis and machining the rotation symmetry plane (1A) by feeding the cutting edge (2A) from the cutting start position with the cutting edge being in contact with the rotating machine component (1) such that different portions of the cutting edge (2A) are successively in contact. The cutting start position includes an X axis coordinate and a Y axis coordinate. Each of the X axis coordinate and the Y axis coordinate is determined based on the first inclination angle (β) and a second inclination angle ($\theta_{XZ}$) formed by the cutting edge with respect to the Z axis on an XZ plane.

According to the above, a machine component having a rotation symmetry plane defined by a generatrix in parallel to an axial line of rotation can highly accurately be machined.

(15) A recording medium according to one manner of the present invention is a computer readable recording medium having a program recorded thereon, the program being for manufacturing a machine component (1) having a rotation symmetry plane (1A) defined by a generatrix (1B) in parallel to an axial line of rotation (10). The program causes the computer to perform receiving a first inclination angle (β) formed by a linear cutting edge (2A) with respect to a Z axis in a YZ plane, a second inclination angle ($\theta_{XZ}$) formed by the cutting edge (2A) with respect to the Z axis in an XZ plane, a radius of the rotation symmetry plane (1A), and a length of the linear cutting edge (2A) in a three-dimensional orthogonal coordinate system in which the axial line of rotation (10) is defined as the Z axis, an axis in a radial direction of the rotation symmetry plane (1A) is defined as an X axis, and an axis orthogonal to both of the Z axis and the X axis is defined as a Y axis, positioning the cutting edge (2A) at a cutting start position, and machining the rotation symmetry plane (1A) by feeding the cutting edge (2A) from the cutting start position along a track while the cutting edge is in contact with the rotating machine component (1). The track is expressed as $(X, Y, Z) = (R+\Delta X - t \times \tan \theta_1', \Delta Y - t \times \tan \theta_2', Z_{min}+t)$ where R represents the radius of the rotation symmetry plane (1A), t represents a variable varying from 0 to $Z_{max} - Z_{min}$, $Z_{min}$ represents a minimum value of a Z axis coordinate of the rotation symmetry plane (1A), and $Z_{max}$ represents a maximum value of the Z axis coordinate of the rotation symmetry plane (1A). $\Delta X$, $\Delta Y$, $\tan \theta_1'$, and $\tan \theta_2'$ satisfy expressions $$\Delta X = -R(1 - \cos \theta_{XY})$$

$$\Delta Y = -R \sin \theta_{XY}$$

$$\tan \theta_1' = \frac{L_{XZ} \sin \theta_{XZ}}{Z_{max} - Z_{min} - L_{XZ} \cos \theta_{XZ}}$$

$$\tan \theta_2' = \frac{L_{YZ} \sin \beta}{Z_{max} - Z_{min} - L_{YZ} \cos \beta}$$

where $$\tan \theta_{XY} = \frac{\tan \theta_{XZ}}{\tan \beta}$$

$$L_{YZ} = L \sqrt{\frac{1 + \tan^2 \beta}{1 + \tan^2 \theta_{XZ} + \tan^2 \beta}}$$

$$L_{XZ} = L \sqrt{\frac{1 + \tan^2 \theta_{XZ}}{1 + \tan^2 \theta_{XZ} + \tan^2 \beta}}$$

where $\beta$ represents the first inclination angle, $\theta_{XZ}$ represents the second inclination angle, and L represents a length of the cutting edge (2A).

According to the above, a machine component having a rotation symmetry plane defined by a generatrix in parallel to an axial line of rotation can highly accurately be machined.

(16) A program according to one manner of the present invention is a program for manufacturing a machine component (1) having a rotation symmetry plane (1A) defined by a generatrix (1B) in parallel to an axial line of rotation (10). The program causes a computer to perform receiving a first inclination angle ($\beta$) formed by a linear cutting edge (2A) with respect to a Z axis in a YZ plane, a second inclination angle ($\theta_{XZ}$) formed by the cutting edge (2A) with respect to the Z axis in an XZ plane, a radius of the rotation symmetry plane (1A), and a length of the cutting edge (2A) in a three-dimensional orthogonal coordinate system in which the axial line of rotation (10) is defined as the Z axis, an axis in a radial direction of the rotation symmetry plane (1A) is defined as an X axis, and an axis orthogonal to both of the Z axis and the X axis is defined as a Y axis, positioning the cutting edge (2A) at a cutting start position, and machining the rotation symmetry plane (1A) by feeding the cutting edge (2A) from the cutting start position along a track while the cutting edge is in contact with the rotating machine component (1). The track is expressed as $(X, Y, Z) = (R+\Delta X - t \times \tan \theta_1', \Delta Y - t \times \tan \theta_2', Z_{min}+t)$, where R represents the radius of the rotation symmetry plane (1A), t represents a variable varying from 0 to $Z_{max} - Z_{min}$, $Z_{min}$ represents a minimum value of a Z axis coordinate of the rotation symmetry plane (1A), and $Z_{max}$ represents a maximum value of the Z axis coordinate of the rotation symmetry plane. $\Delta X$, $\Delta Y$, $\tan \theta_1'$, and $\tan \theta_2'$ satisfy expressions $$\Delta X = -R(1 - \cos \theta_{XY})$$

$$\Delta Y = -R \sin \theta_{XY}$$

$$\tan \theta_1' = \frac{L_{XZ} \sin \theta_{XZ}}{Z_{max} - Z_{min} - L_{XZ} \cos \theta_{XZ}}$$

$$\tan \theta_2' = \frac{L_{YZ} \sin \beta}{Z_{max} - Z_{min} - L_{YZ} \cos \beta}$$

where $$\tan \theta_{XY} = \frac{\tan \theta_{XZ}}{\tan \beta}$$

$$L_{YZ} = L \sqrt{\frac{1 + \tan^2 \beta}{1 + \tan^2 \theta_{XZ} + \tan^2 \beta}}$$

$$L_{XZ} = L \sqrt{\frac{1 + \tan^2 \theta_{XZ}}{1 + \tan^2 \theta_{XZ} + \tan^2 \beta}}$$

where $\beta$ represents the first inclination angle, $\theta_{XZ}$ represents the second inclination angle, and L represents a length of the cutting edge (2A).

According to the above, a machine component having a rotation symmetry plane defined by a generatrix in parallel to an axial line of rotation can highly accurately be machined.

[DETAILS OF EMBODIMENTS OF THE PRESENT INVENTION]

Embodiments of the present invention will be described hereinafter with reference to the drawings. The same or corresponding elements in the drawings below have the same reference characters allotted and description thereof will not be repeated. For better understanding of the description, only some of constituent elements of the invention may be shown in the drawings.

(First Embodiment)

FIG. 1 is a perspective view showing a manufacturing method according to a first embodiment of the present invention. As shown in FIG. 1, a machine component 1 having a rotation symmetry plane 1A rotates around an axial line of rotation 10. Machine component 1 is a product manufactured with the manufacturing method according to one embodiment of the present invention.

FIG. 1 shows a machining step representing one step in the manufacturing method according to one embodiment of the present invention. Therefore, in the step shown in FIG. 1, machine component 1 can also be called a workpiece. The machining step includes cutting. The manufacturing method according to the first embodiment of the present invention may include other steps. The manufacturing method can include, for example, a casting step, an assembly step, and an inspection step.

In the manufacturing method according to the first embodiment of the present invention, feed of a cutting edge 2A is controlled in accordance with a three-dimensional orthogonal coordinate system. In FIG. 1, a Z axis corresponds to axial line of rotation 10. An X axis and a Y axis are both perpendicular to the Z axis and perpendicular to each other. The X axis can be set to a direction determining a dimension of a diameter of a machined surface, which is also referred to as a radial direction in cutting and machining. The Y axis is an axis orthogonal to both of the X axis and the Z axis and called, for example, a lateral direction. For example, axes defined as the X axis, the Y axis, and the Z axis in a lathe can be applied to the X axis, the Y axis, and the Z axis in the embodiment of the present invention.

In this embodiment, the direction of the Z axis is defined as a direction of feed (vertical feed) of cutting edge 2A. A negative direction of the X axis is defined as a direction of cut into machine component 1. The direction of the Y axis is defined as a direction opposite to a direction of movement of cutting edge 2A for cutting.

Cutting edge 2A is a part of a cutting insert (not shown in FIG. 1). The cutting insert is attachable to and removable from a holder 2 (tool). FIG. 1 shows only a part of cutting edge 2A of the cutting insert. When it is not necessary to distinguish between the cutting edge and the cutting insert, both of them are collectively referred to as the "cutting edge."

Cutting edge 2A is inclined at an angle greater than 0° and smaller than 90° with respect to the direction of the Z axis. Cutting edge 2A is set obliquely with respect to the direction of the Z axis along a direction of feed of cutting edge 2A. Cutting edge 2A is fed along a track having an X axis component, a Y axis component, and a Z axis component while it is in contact with machine component 1. Rotation symmetry plane 1A is thus machined. During a period from start of cutting to end of cutting, individual regions of cutting edge 2A from a tip end 3_1 to a rear end 3_5 successively come in contact with rotation symmetry plane 1A (that is, the machined surface).

In this embodiment, a surface of a frustum is defined as rotation symmetry plane 1A. A surface of a cone may be defined as rotation symmetry plane 1A. Rotation symmetry plane 1A is defined by a ridgeline 1B inclined at an angle $\theta_a$ greater than 0° and smaller than 90°. A surface formed as a result of rotation of ridgeline 1B around axial line of rotation 10 is rotation symmetry plane 1A.

Machine component 1 having rotation symmetry plane 1A is not particularly limited. In one embodiment, a pulley for constructing a continuously variable transmission of a car represents machine component 1.

Figure 2:
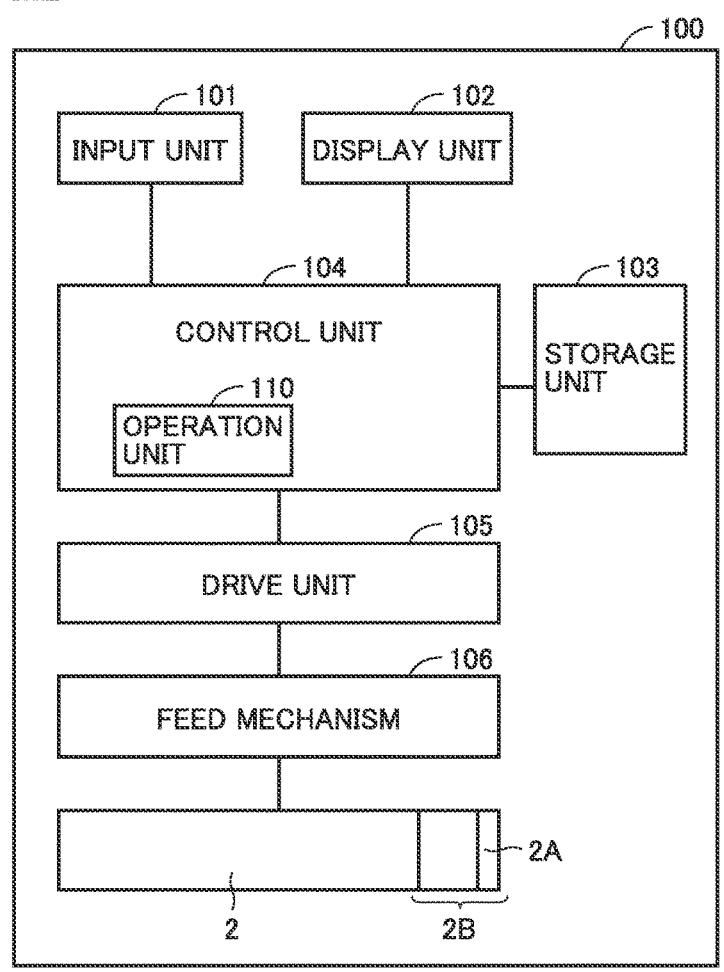
FIG. 2 is a block diagram schematically showing a configuration of a manufacturing apparatus according to the first embodiment of the present invention.

FIG. 2 is a block diagram schematically showing a configuration of a manufacturing apparatus according to the first embodiment of the present invention.

A manufacturing apparatus 100 according to the first embodiment of the present invention can be implemented, for example, by a computer numerical control (CNC) lathe. As shown in FIG. 2, manufacturing apparatus 100 includes an input unit 101, a display unit 102, a storage unit 103, a control unit 104, a drive unit 105, a feed mechanism 106, holder 2, and a cutting insert 2B having cutting edge 2A.

Input unit 101 is operated by a user. Input unit 101 accepts information from the user and sends the information to control unit 104. The information from the user includes information on a program selected by the user, various types of data necessary for manufacturing machine component 1 (machining rotation symmetry plane 1A), and a command from the user.

Display unit 102 shows characters, signs, and graphics. Display unit 102 can show information accepted by input unit 101 and a result of operation by control unit 104.

Storage unit 103 stores information accepted by input unit 101 and a program for manufacturing machine component 1. The program includes a program for machining rotation symmetry plane 1A. According to one embodiment, storage unit 103 is implemented by a rewritable non-volatile storage device. Therefore, storage unit 103 corresponds to a recording medium having a program recorded thereon. The program may be provided through a communication line. In this case as well, the program is stored in storage unit 103.

Control unit 104 is implemented by a computer configured to control manufacturing apparatus 100 in a centralized manner. Control unit 104 includes an operation unit 110. Operation unit 110 performs numeric operations based on information accepted by input unit 101 and information stored in storage unit 103. For example, operation unit 110 may be embodied as a result of execution of a program by a central processing unit (CPU).

Drive unit 105 drives feed mechanism 106. Drive unit 105 is controlled by control unit 104. Feed mechanism 106 is configured to be able to feed holder 2 in the direction of the X axis, the direction of the Y axis, and the direction of the Z axis.

Holder 2 holds cutting edge 2A by holding cutting insert 2B. Holder 2 is attached to feed mechanism 106. During machining of rotation symmetry plane 1A by cutting edge 2A, holder 2 is fixed to feed mechanism 106 so as not to be rotatable around an axis of rotation. Therefore, during machining of rotation symmetry plane 1A, holder 2 holds an angle of cutting edge 2A. During a period other than machining of rotation symmetry plane 1A (by way of example, during maintenance of manufacturing apparatus 100), holder 2 can rotate around the axis of rotation. Thus, maintenance of manufacturing apparatus 100 is advantageously facilitated.

Cutting edge 2A is formed by a ridgeline between a rake face and a flank of cutting insert 2B. In the embodiment of the present invention, the ridgeline is linear. Cutting edge 2A is linear. The term "linear" herein means that a shape of cutting edge 2A is linear. A shape of cutting insert 2B for implementing the linear cutting edge is not particularly limited. In one embodiment, cutting insert 2B is in a triangular shape.

Figure 3:
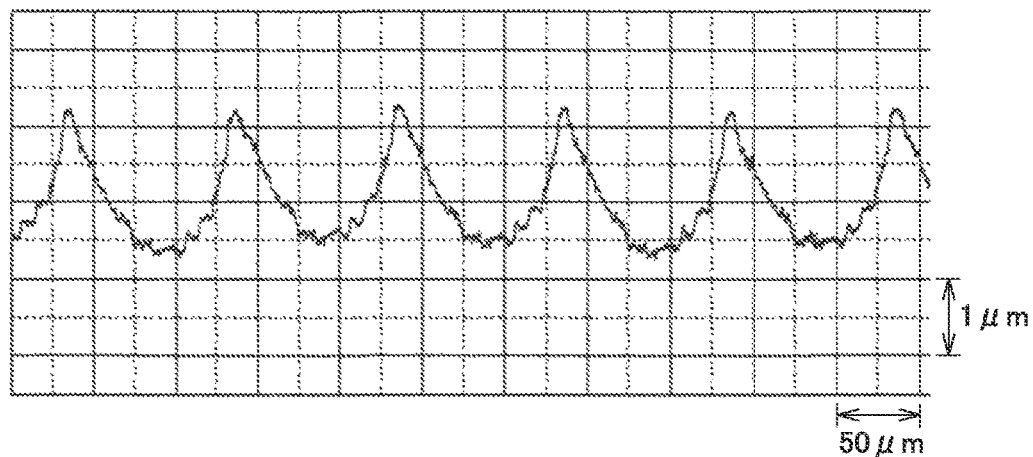
FIG. 3 is a graph showing surface roughness of a machined surface cut through point cutting.
Figure 4:
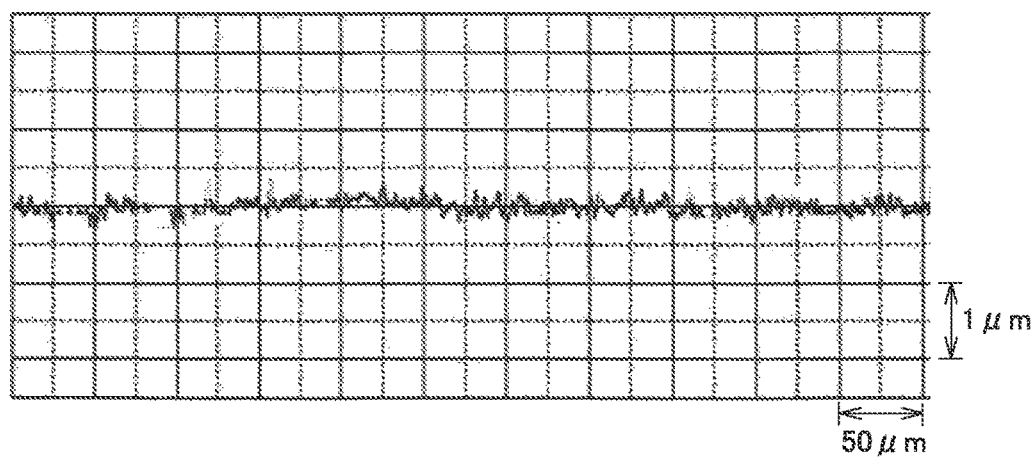
FIG. 4 is a graph showing surface roughness of a surface cut and machined in accordance with the manufacturing method according to the embodiment of the present invention.

Machining with the use of a linear cutting edge is more advantageous in surface roughness and efficiency than point cutting. FIG. 3 is a graph showing surface roughness of a machined surface cut through point cutting. FIG. 4 is a graph showing surface roughness of a surface cut and machined in accordance with the manufacturing method according to the embodiment of the present invention. Scales on the ordinate and the abscissa of the graphs in FIGS. 3 and 4 are the same.

As shown in FIGS. 3 and 4, the manufacturing method according to the embodiment of the present invention can be higher in accuracy of a machined surface (surface roughness) than point cutting while a rate of feed of the cutting edge is high. In point cutting, during a period from start of cutting to end of cutting, the same region of cutting edge 2A is in contact with the machined surface. Therefore, the cutting edge wears fast. According to the embodiment of the present invention, during a period from start of cutting until end of cutting, individual regions of linear cutting edge 2A successively come in contact with the machined surface. Wear is thus distributed over the entire cutting edge 2A. Therefore, lifetime of cutting edge 2A can be extended.

The manufacturing method, in particular, machining of the rotation symmetry plane, according to the first embodiment of the present invention will be described in detail below.

1. Definition of Parameters

Figure 5:
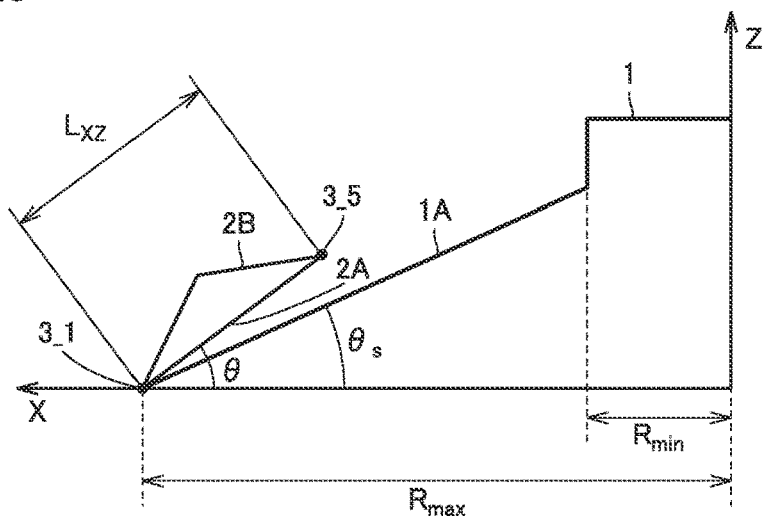
FIG. 5 is a schematic diagram schematically showing a cutting edge projected on an XZ plane.
Figure 6:
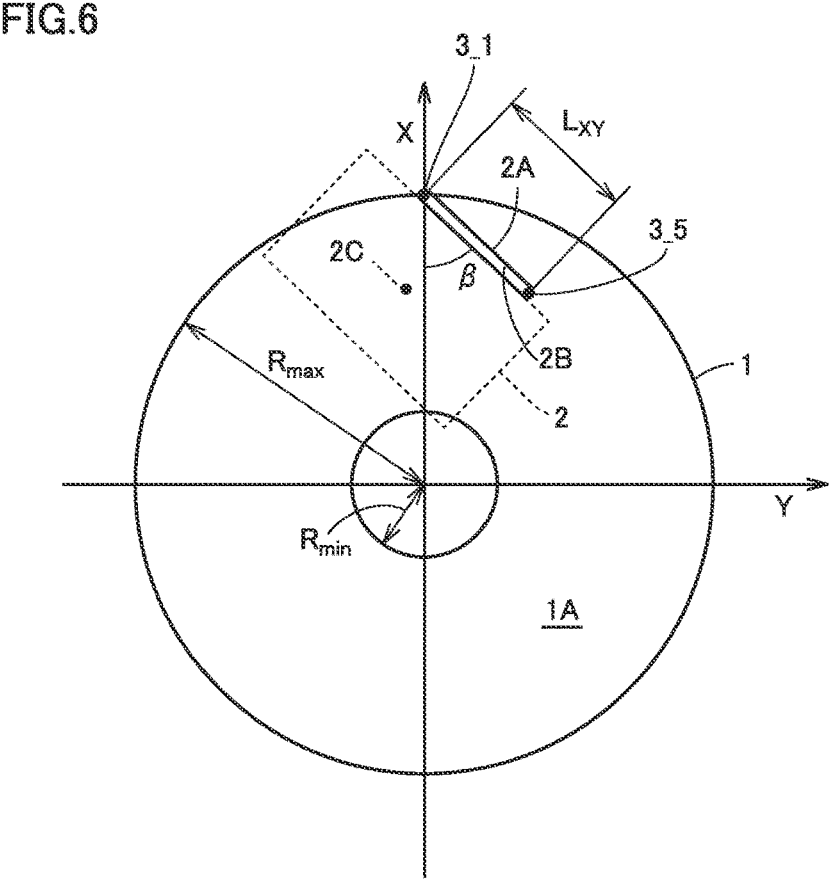
FIG. 6 is a schematic diagram schematically showing a holder and the cutting edge projected on an XY plane.

FIG. 5 is a schematic diagram schematically showing cutting edge 2A projected on the XZ plane. FIG. 6 is a schematic diagram schematically showing holder 2 and cutting edge 2A projected on the XY plane.

In FIG. 5, an angle $\theta_S$ represents a target angle formed by rotation symmetry plane 1A (that is, the machined surface) of machine component 1 with respect to the X axis in the XZ plane. Angle $\theta_S$ is hereinafter called a "target angle $\theta_S$." Cutting edge 2A is inclined by an angle θ (a first inclination angle) with respect to the X axis in the XZ plane. In FIG. 5, $R_{max}$ represents a maximum radius of rotation symmetry plane 1A. $R_{min}$ represents a minimum radius of rotation symmetry plane 1A. $L_{XZ}$ represents a length of cutting edge 2A on the XZ plane.

An angle β represents an inclination angle (a second inclination angle) formed by cutting edge 2A with respect to the X axis in the XY plane. In FIG. 6, $L_{XY}$ represents a length of cutting edge 2A on the XY plane.

Angle β may be defined as an inclination angle formed by the holder with respect to the X axis in the XY plane. Angle β can be defined as an inclination of holder 2 from a state that an angle formed by cutting edge 2A with respect to the X axis is 0°. In attaching holder 2 to feed mechanism 106, holder 2 can rotate around an axis of rotation 2C which is in parallel to the Z axis. After holder 2 is attached to feed mechanism 106, holder 2 is substantially not rotatable.

Figure 7:
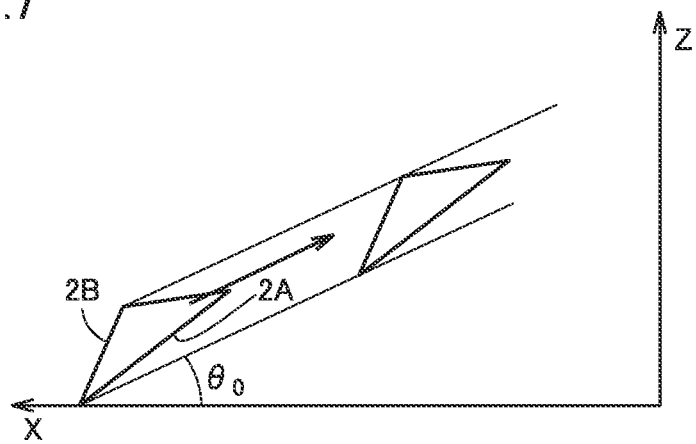
FIG. 7 is a schematic diagram for illustrating a trace of the cutting edge on the XZ plane.
Figure 8:
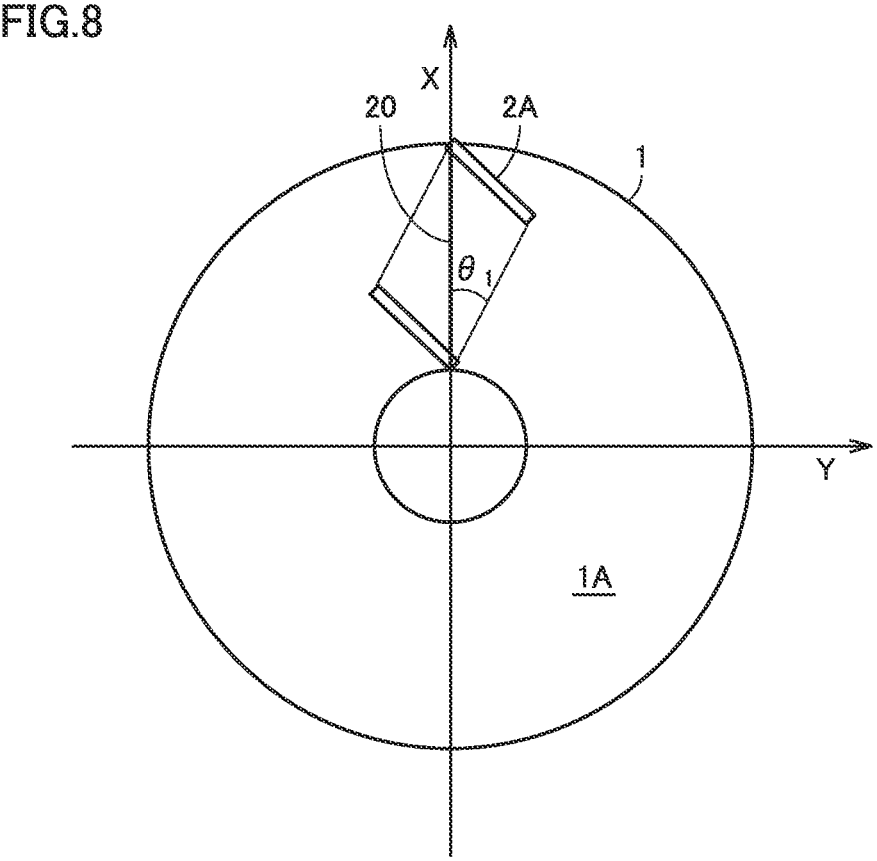
FIG. 8 is a schematic diagram for illustrating a trace of the cutting edge on the XY plane.

FIG. 7 is a schematic diagram for illustrating a trace of cutting edge 2A on the XZ plane. FIG. 8 is a schematic diagram for illustrating a trace of cutting edge 2A on the XY plane. Referring to FIGS. 7 and 8, a track of cutting edge 2A forms an angle θ with respect to the X axis on the XZ plane. The track of cutting edge 2A forms an angle $θ_1$ with respect to the X axis on the XY plane. A cutting line 20 is formed on the X axis. Therefore, cutting line 20 corresponds to ridgeline 1B of rotation symmetry plane 1A.

2. Example of Non-Corrected Track

When the cutting edge is fed along a non-corrected track, in a projected image of cutting edge 2A onto the XZ plane (see FIG. 5), angle θ (first inclination angle) should match with target angle $θ_S$. An inclination of cutting edge 2A is adjusted such that angle θ matches with target angle $θ_S$ when holder 2 is attached to feed mechanism 106.

An inclination angle of cutting edge 2A is measured at two or more portions of cutting edge 2A, for example, with such a measurement instrument as a dial gauge. A shim or the like is inserted in the holder for the insert so as to correct an angle of attachment. When holder 2 has a mechanism for correcting an angle of attachment of cutting edge 2A, an inclination angle of cutting edge 2A is measured and thereafter an angle of attachment of cutting edge 2A can be corrected with the correction mechanism. An inclination angle of cutting edge 2A can be measured with the dial gauge described above or a measurement instrument such as a presetter.

(1) Track

Figure 9:
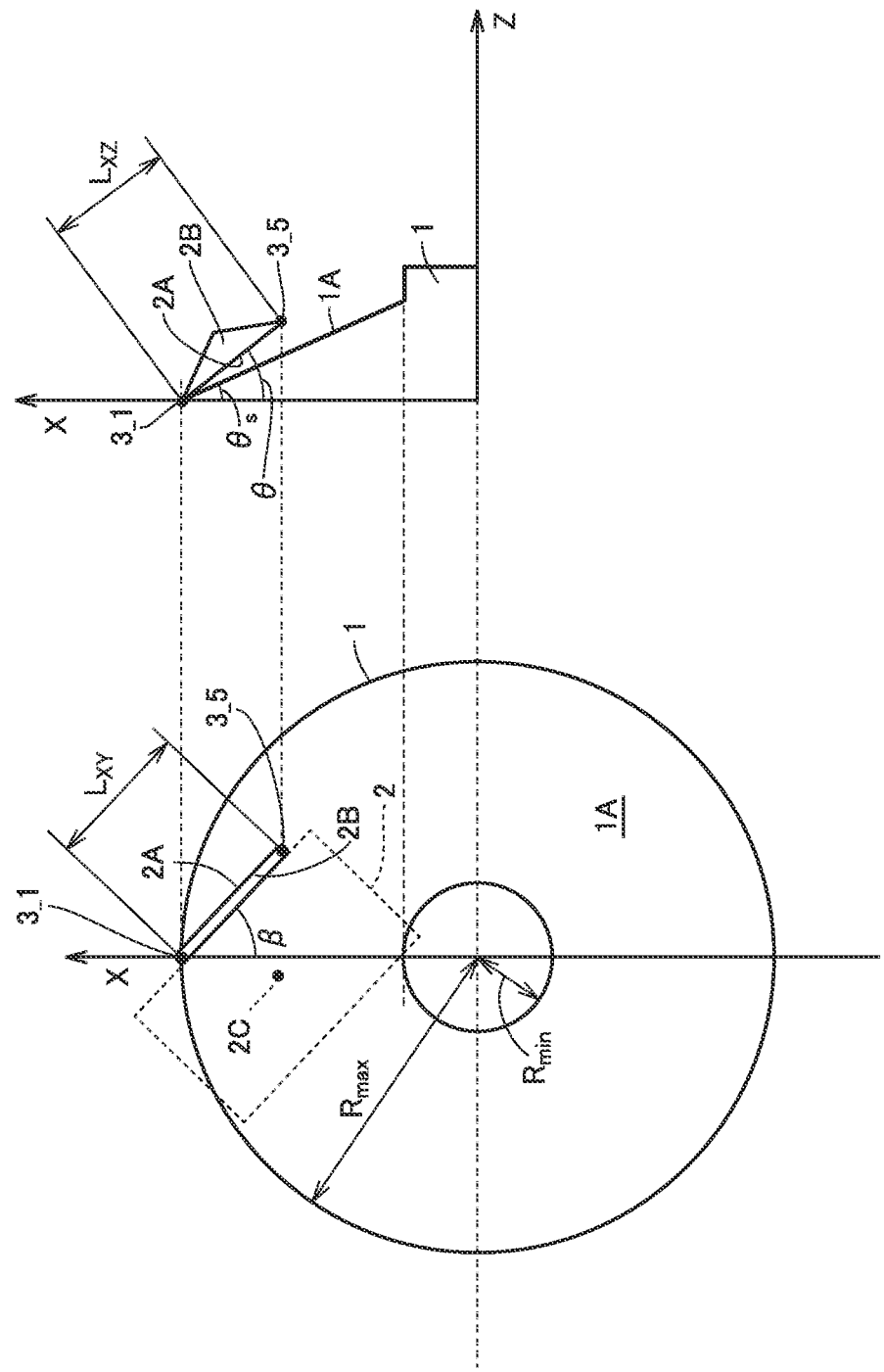
FIG. 9 is a schematic diagram for illustrating a method for machining a machine component in an example of a non-corrected track.

FIG. 9 is a schematic diagram for illustrating a method for machining machine component 1 in the example of the non-corrected track. As shown in FIG. 9, initially, tip end 3_1 of cutting edge 2A is positioned at a cutting start position. The "tip end" refers to an end portion of cutting edge 2A which comes in contact with machine component 1 first. A coordinate of tip end 3_1 at the cutting start position is expressed as (X, Y, Z)=($R_{max}$, 0, $Z_{min}$).

Rotation symmetry plane 1A is machined by feeding cutting edge 2A while it is in contact with rotating machine component 1. Tip end 3_1 of cutting edge 2A changes along a track (X, Y, Z)=($R_{max}$−t, −t×tan $θ_1$, $Z_{min}$+t×tan $θ_0$). t represents a variable which varies from 0 to ($R_{max}$−$R_{min}$).

Initial positions of the tip end and the rear end of cutting edge 2A will now be described in further detail. As shown in FIG. 9, rear end 3_5 of cutting edge 2A is an end portion of cutting edge 2A located opposite to tip end 3_1. The "initial position" refers to a position at the time of start of cutting. The initial position of tip end 3_1 of cutting edge 2A matches with the "cutting start position."

Figure 10:
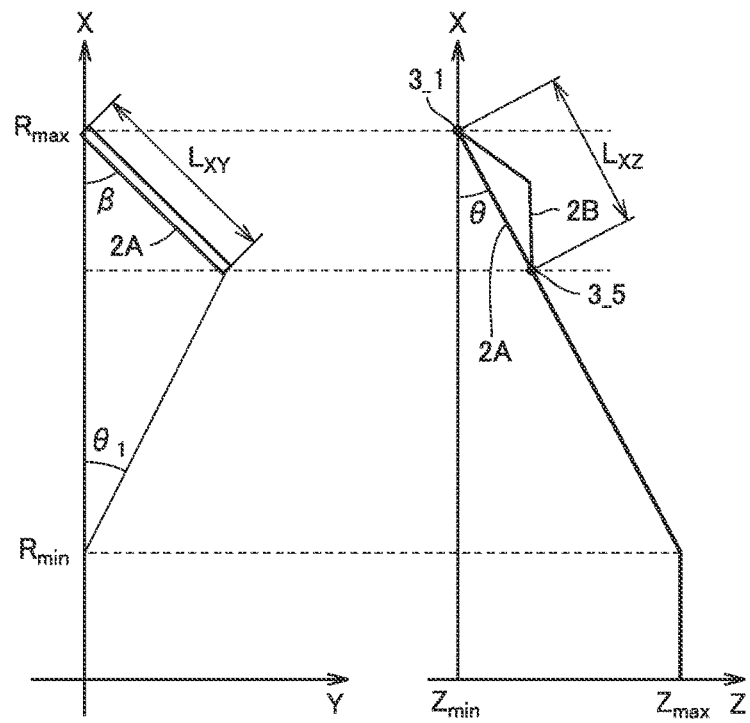
FIG. 10 is a schematic diagram for illustrating initial positions of a tip end and a rear end of the cutting edge in feeding the cutting edge along the non-corrected track.

FIG. 10 is a schematic diagram for illustrating initial positions of tip end 3_1 and rear end 3_5 of cutting edge 2A in feeding the cutting edge along the non-corrected track. As described above, the initial position of tip end 3_1 of cutting edge 2A is expressed as ($R_{max}$, 0, $Z_{min}$). The initial position of rear end 3_5 of cutting edge 2A is expressed as ($R_{max}$+$L_{XY}$×cos β, 0, $Z_{min}$+$L_{XY}$×cos θ). An X axis component, a Y axis component, and a Z axis component of a difference between the initial position of the tip end of cutting edge 2A and the initial position of the rear end of cutting edge 2A are expressed as (dX, dY, dZ). dX, dY, and dZ satisfy relation below.

$$dX^2 + dY^2 + dZ^2 = L^2$$

$$dY = dX \tan β$$

$$dZ = dX \tan θ$$

$$dX = L\sqrt{\frac{1}{1+\tan^2 β + \tan^2 θ}}$$

$$L_{XY} = \sqrt{dX^2 + dY^2} = L\sqrt{\frac{1+\tan^2 β}{1+\tan^2 β + \tan^2 θ}}$$

$$L_{XZ} = \sqrt{dX^2 + dZ^2} = L\sqrt{\frac{1+\tan^2 θ}{1+\tan^2 β + \tan^2 θ}}$$

Figure 11:
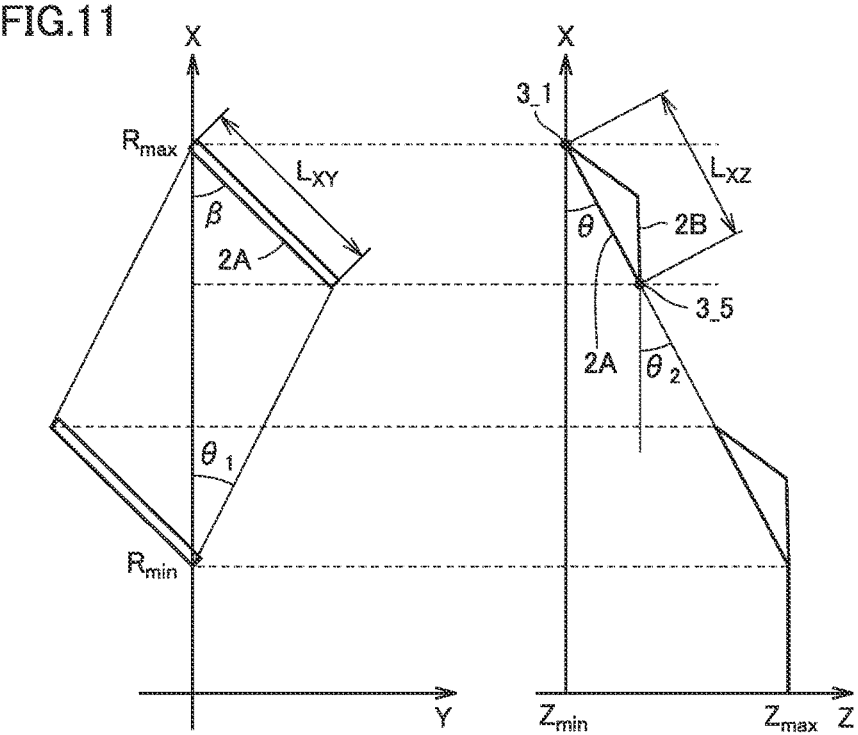
FIG. 11 is a schematic diagram for illustrating a track of the rear end of the cutting edge.

FIG. 11 is a schematic diagram for illustrating a track of the rear end of cutting edge 2A A position of rear end 3_5 of cutting edge 2A at the time of end of cutting is called a "final position." The final position corresponds to a cutting end position.

As shown in FIG. 11, the final position of rear end 3_5 of cutting edge 2A is expressed as ($R_{min}$, 0, $Z_{max}$). An X axis component, a Y axis component, and a Z axis component of a difference between the final position and the initial position of rear end 3_5 of cutting edge 2A are expressed as (δX, δY, δZ). δX, δY, and δZ satisfy relation below.

$$δX = R_{max} − L_{XY} \cos β$$

$$δY = L_{XY} \sin β$$

$$δZ = Z_{max} − Z_{min}$$

Angles $θ_S$, $θ_0$, and $θ_1$ satisfy relation below.

$$\tan θ_0 = \frac{δZ}{δX} = \tan θ_s$$

$$\tan θ_1 = \frac{δY}{δX} = \frac{L_{XY} \sin β}{R_{max} − R_{min} − L_{XY} \cos β}$$

Target angle $θ_S$ formed by rotation symmetry plane 1A with respect to the XY plane, maximum radius $R_{max}$ of rotation symmetry plane 1A, and minimum radius $R_{min}$ of rotation symmetry plane 1A have design values. Angle β and angle θ have measured values. Length L of cutting edge 2A has a predetermined value. Therefore, these values can be obtained before start of machining of rotation symmetry plane 1A.

In manufacturing apparatus 100 shown in FIG. 2, these values are input to input unit 101 and stored, for example, in storage unit 103. Control unit 104 can calculate tan $θ_0$ and tan $θ_1$ from maximum radius $R_{max}$, minimum radius $R_{min}$, angle β, angle θ, and length L in accordance with the expressions above. Therefore, control unit 104 can calculate a track of tip end 3_1 of cutting edge 2A.

(2) Results of Machining

Figure 12:
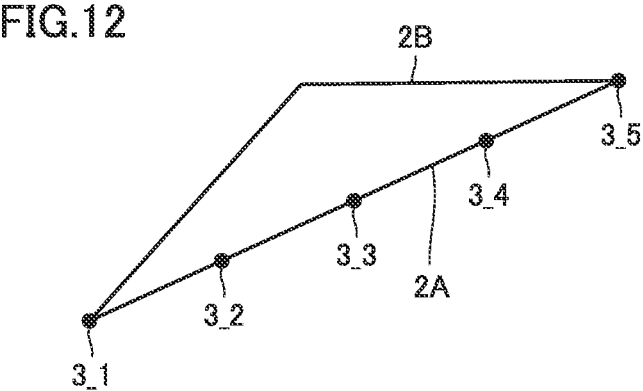
FIG. 12 is a diagram showing five regions of the cutting edge for monitoring a trace of the cutting edge.

FIG. 12 is a diagram showing five regions of cutting edge 2A for monitoring a trace of cutting edge 2A. In addition to tip end 3_1 and rear end 3_5, regions 3_2, 3_3, and 3_4 of cutting edge 2A are indicated as points. Positions of regions 3_2, 3_3, and 3_4 correspond to positions where a length between tip end 3_1 and rear end 3_5 is divided into four equal parts.

Figure 13:
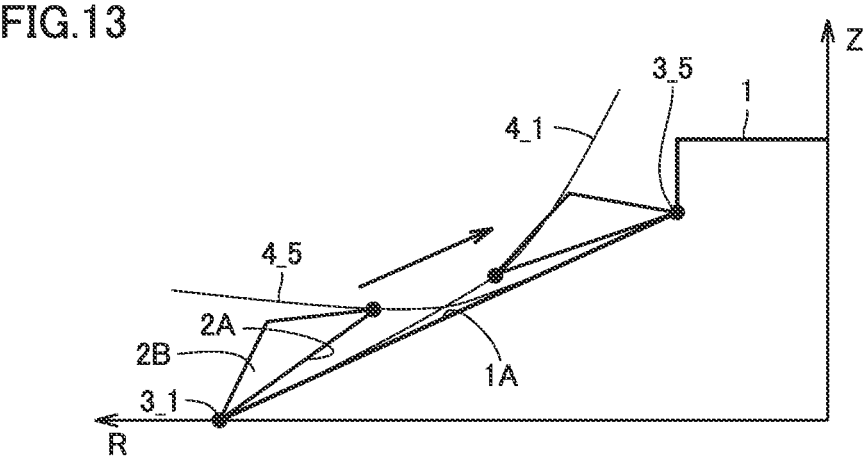
FIG. 13 is a schematic diagram schematically showing traces of the tip end and the rear end of the cutting edge in an RZ plane.

FIG. 13 is a schematic diagram schematically showing traces of the tip end and the rear end of cutting edge 2A in an RZ plane. The "RZ plane" refers to a plane determined by the radius and the axial line of rotation (the Z axis) of rotation symmetry plane 1A. FIG. 13 shows a trace 4_1 drawn by tip end 3_1 of cutting edge 2A and a trace 4_5 drawn by rear end 3_5 of cutting edge 2A. A machined shape on the RZ plane corresponds to an envelope of the trace drawn by each region of cutting edge 2A on the RZ plane.

Figure 14:
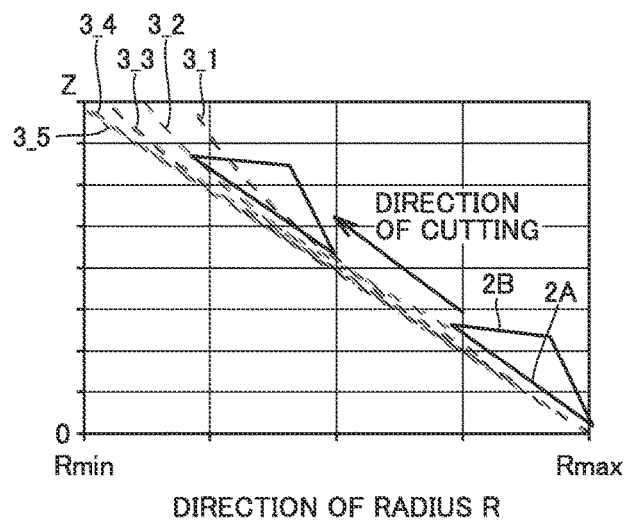
FIG. 14 is a diagram showing results of calculation of a machined shape on the RZ plane when an angle of the cutting edge is equal to a target angle.
Figure 15:
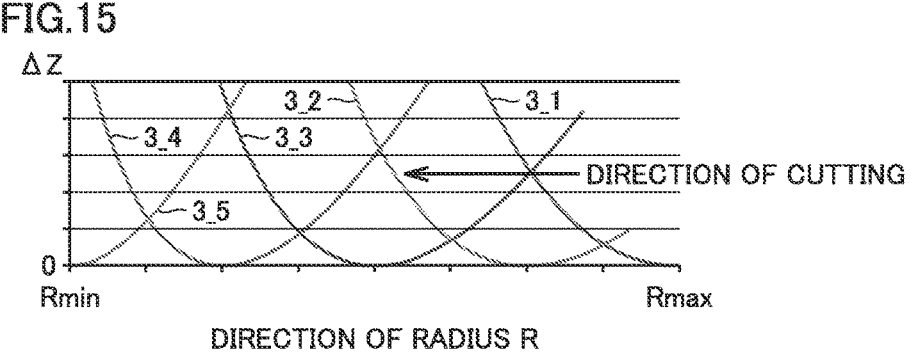
FIG. 15 is a diagram showing a difference in a direction of a Z axis between a machined surface and a surface as designed, based on the results of calculation shown in FIG. 14.

FIG. 14 is a diagram showing results of calculation of a machined shape on the RZ plane when angle θ of cutting edge 2A is equal to target angle $θ_S$. FIG. 15 is a diagram showing a difference ΔZ in the direction of the Z axis between the machined surface and a surface as designed, based on the results of calculation shown in FIG. 14. Curves in the graph are brought in correspondence with tip end 3_1, rear end 3_5, and regions 3_2 to 3_4 of cutting edge 2A, respectively. As shown in FIGS. 14 and 15, when angle θ of cutting edge 2A is equal to target angle $θ_S$, a condition of ΔZ=0 is satisfied. A surface as designed can be formed through cutting and machining.

Figure 16:
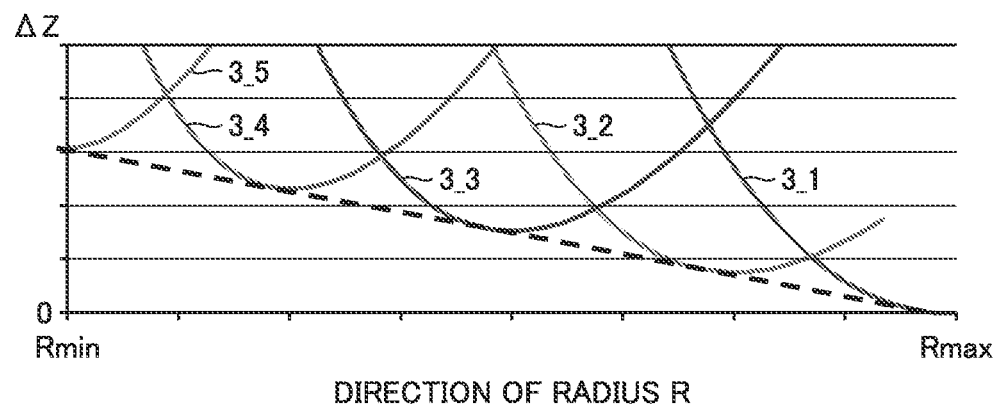
FIG. 16 is a diagram showing results of calculation of a machined shape on the RZ plane (non-corrected track) when an angle of the cutting edge is greater than a target angle.
Figure 17:
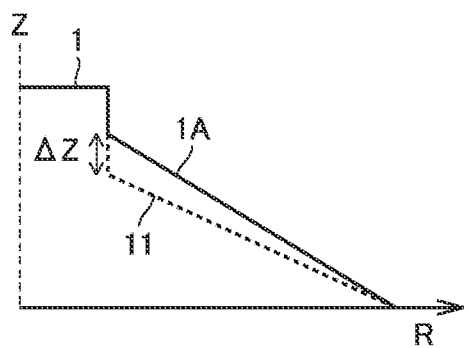
FIG. 17 is a diagram representing a difference in the direction of the Z axis between the machined surface (rotation symmetry plane) and the surface as designed, based on the results of calculation shown in FIG. 16.

FIG. 16 is a diagram showing results of calculation of a machined shape on the RZ plane when angle θ of cutting edge 2A is greater than target angle $θ_S$. FIG. 17 is a diagram representing difference ΔZ in the direction of the Z axis between the machined surface (rotation symmetry plane 1A) and a surface 11 as designed, based on the results of calculation shown in FIG. 16. As shown in FIGS. 16 and 17, when a condition of $θ>θ_S$ is satisfied, ΔZ increases in a positive direction as radius R is smaller. When a condition of $θ>θ_S$ is satisfied, an unmachined portion remains.

Figure 18:
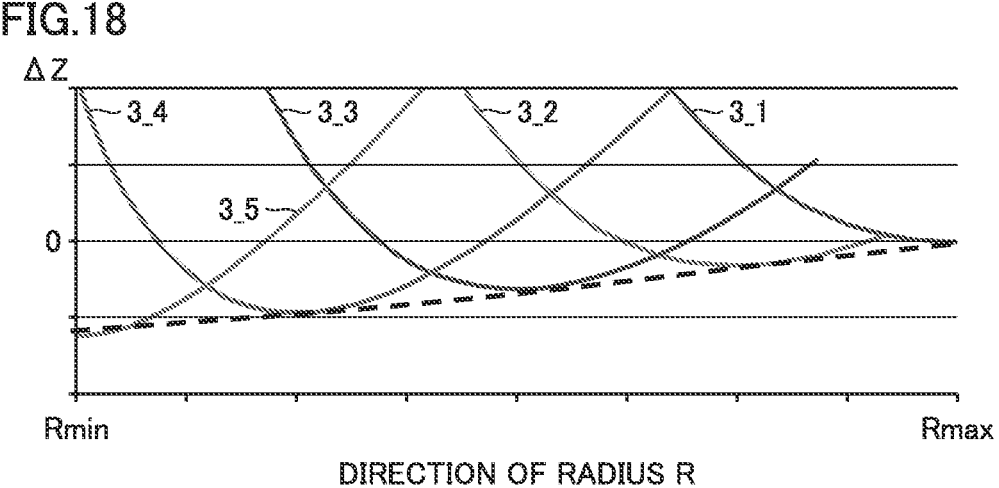
FIG. 18 is a diagram showing results of calculation of a machined shape on the RZ plane (non-corrected track) when an angle of the cutting edge is smaller than a target angle.
Figure 19:
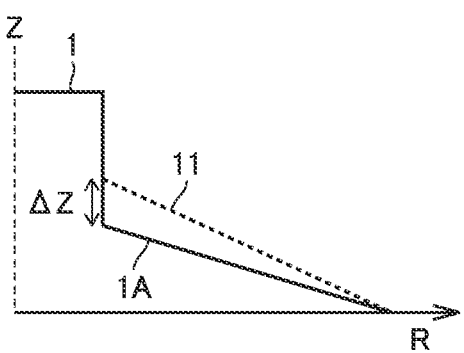
FIG. 19 is a diagram representing a difference in the direction of the Z axis between the machined surface (rotation symmetry plane) and the surface as designed, based on the results of calculation shown in FIG. 18.

FIG. 18 is a diagram showing results of calculation of a machined shape on the RZ plane when angle θ of cutting edge 2A is smaller than target angle $θ_S$. FIG. 19 is a diagram representing difference ΔZ in the direction of the Z axis between the machined surface (rotation symmetry plane 1A) and surface 11 as designed, based on the results of calculation shown in FIG. 18. As shown in FIGS. 18 and 19, when a condition of $θ<θ_S$ is satisfied, ΔZ increases in a negative direction as radius R is smaller. When a condition of $θ<θ_S$ is satisfied, cutting is excessive.

As shown in FIGS. 14 to 19, in order to form a surface as designed through cutting and machining, angle θ of cutting edge 2A should match with target angle $θ_S$. Actually, however, it is often difficult to match angle θ of cutting edge 2A with target angle $θ_S$. When angle θ is displaced from target angle $θ_S$, an unmachined portion remains or cutting is excessive.

When a holder having a mechanism for adjusting an inclination of cutting edge 2A (for example, a rotation mechanism) is employed, angle θ of cutting edge 2A can be adjusted after holder 2 is attached to feed mechanism 106. Such a portion of the mechanism, however, tends to be lower in rigidity than other portions of holder 2. Therefore, when a hard material (such as a hardened steel material) is cut, an inclination of cutting edge 2A may vary. When an inclination of cutting edge 2A varies, it is more difficult to machine the machine component as designed.

3. Example of Corrected Cutting Start Position and Corrected Track

In the first embodiment of the present invention, the cutting start position and the track are corrected in accordance with angle θ and angle β of cutting edge 2A.

(1) Correction of Cutting Start Position and Track

Figure 20:
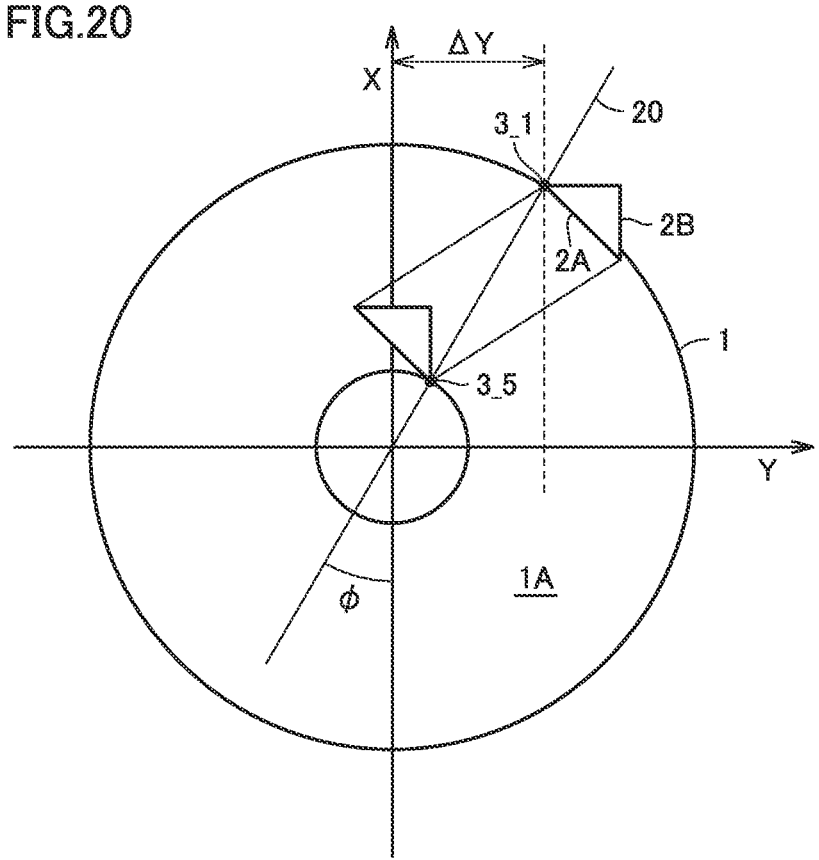
FIG. 20 is an XY plane view for schematically illustrating the manufacturing method according to the first embodiment of the present invention.
Figure 21:
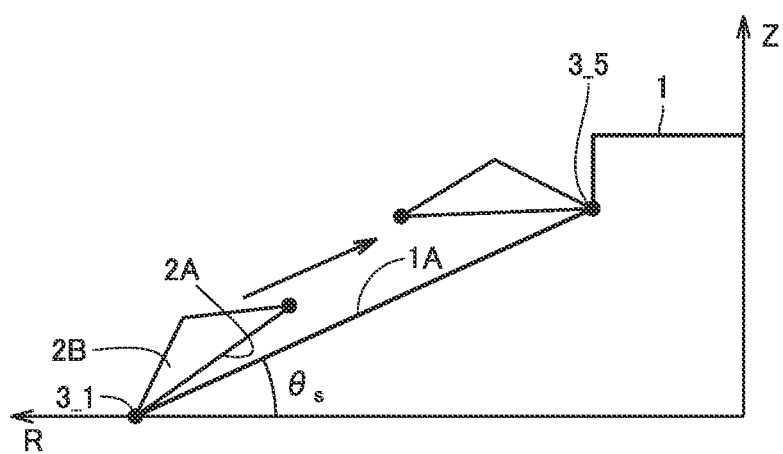
FIG. 21 is an RZ plane view for schematically illustrating the manufacturing method according to the first embodiment of the present invention.

FIG. 20 is an XY plane view for schematically illustrating the manufacturing method according to the first embodiment of the present invention. FIG. 21 is an RZ plane view for schematically illustrating the manufacturing method according to the first embodiment of the present invention. As shown in FIG. 20, in the first embodiment of the present invention, the cutting start position is displaced by a correction amount ΔY in the direction of the Y axis from a position on the X axis. A coordinate of the cutting start position, that is, the initial position of tip end 3_1 of cutting edge 2A, is expressed as ($R_{max}$, ΔY, $Z_{min}$). As shown in FIG. 21, cutting edge 2A is inclined at an angle greater than 0° and smaller than 90° with respect to the Z axis.

Then, cutting edge 2A is fed to machine rotation symmetry plane 1A. The coordinate (X, Y, Z) of tip end 3_1 of cutting edge 2A varies along the track ($R_{max}$-t, ΔY-t×tan $θ_1'$, $Z_{min}$+t×tan $θ_0'$). t represents a variable which varies from 0 to ($R_{max}$-$R_{min}$). Therefore, the track has an amount of movement in the directions of all of the X axis, the Y axis, and the Z axis. A direction of the track of the cutting edge is a direction transverse to each of the X axis, the Y axis, and the Z axis. Cutting line 20 forms an angle φ with respect to the X axis on the XY plane and passes through the origin of the XY coordinate system.

According to the first embodiment of the present invention, the cutting start position is moved by ΔY in the direction of the Y axis. Angles $θ_0$ and $θ_1$ are substituted with angles $θ'_0$ and $θ'_1$. Thus, as shown in FIG. 21, an angle of the machined surface can match with target angle $θ_S$ on the RZ plane. Therefore, machine component 1 can accurately be manufactured. Furthermore, modification to a program for operating manufacturing apparatus 100 can be lessened.

Determination of correction amount ΔY and angles $θ'_0$ and $θ'_1$ will now be described in detail.

Figure 22:
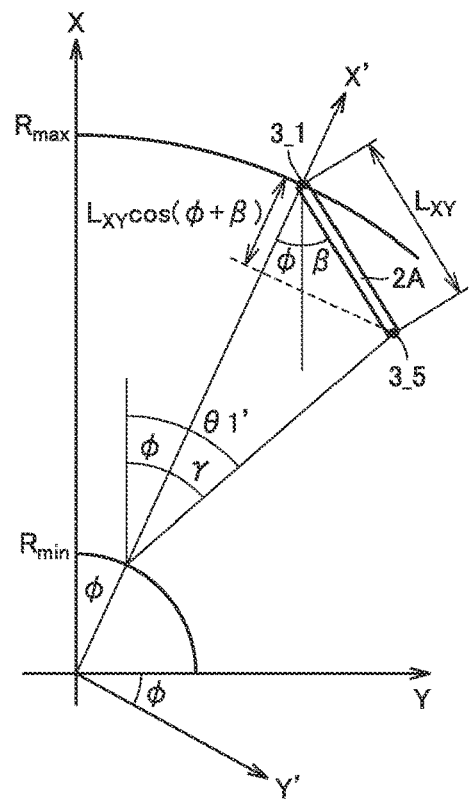
FIG. 22 is a diagram for illustrating initial positions of the tip end and the rear end of the cutting edge in feeding the cutting edge along a corrected track.

FIG. 22 is a diagram for illustrating initial positions of tip end 3_1 and rear end 3_5 of cutting edge 2A in feeding cutting edge 2A along a corrected track. Referring to FIG. 22, tip end 3_1 of cutting edge 2A is located on a circumference having radius $R_{max}$ on the XY plane. A straight line connecting tip end 3_1 and the origin to each other forms angle 4 with respect to the X axis on the XY plane. A position of tip end 3_1 of cutting edge 2A is expressed as ($R_{max}$ cos φ, $R_{max}$ sin φ, $Z_{max}$).

An X' axis and a Y' axis are axes resulting from rotation of the X axis and the Y axis by angle 4 clockwise around the Z axis. Angle 4 refers to an angle at the time when an angle of attachment of cutting edge 2A matches with target angle $θ_S$ on an X'Z plane. An X axis component, a Y axis component, and a Z axis component of a difference between the initial position of tip end 3_1 of cutting edge 2A and the initial position of rear end 3_5 of cutting edge 2A in an X'Y'Z coordinate system are expressed as (dX', dY', dZ). dX', dY', and dZ satisfy relation below. dX, dY, and dZ shown below refer to an X axis component, a Y axis component, and a Z axis component of a difference between the initial position of the tip end of cutting edge 2A and the initial position of the rear end of cutting edge 2A in feeding the cutting edge along the non-corrected track (see FIG. 10).

$dX = L_{XY} \cos β$ $dZ = dX \tan θ$ $$dX'=L_{XY}\cos(\phi+\beta)$$

Relation below is further satisfied.
In order to satisfy $$\frac{dZ}{dX'}=\tan\theta_s,$$

$$\frac{dZ}{dX'}=\frac{L_{XY}\cos\beta}{L_{XY}\cos(\phi+\beta)}\tan\theta=\tan\theta_s$$

is satisfied.
Relation below is derived from the expressions above.

$$\frac{\cos(\phi+\beta)}{\cos\beta}=\frac{\tan\theta}{\tan\theta_s}$$

$$\Delta Y=R_{max}\sin\phi$$

Figure 23:
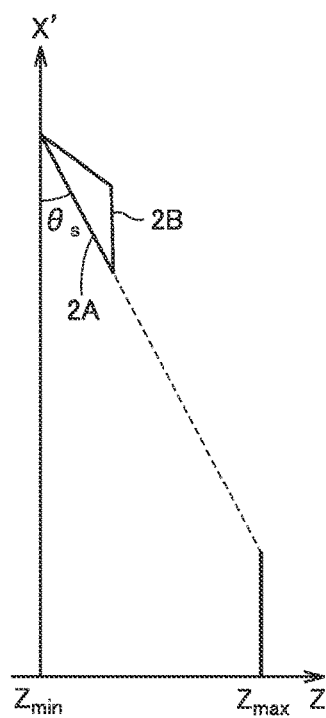
FIG. 23 is a schematic diagram for illustrating the track of the rear end of the cutting edge.

FIG. 23 is a schematic diagram for illustrating the track of rear end 3_5 of cutting edge 2A. As shown in FIG. 23, a projected image of cutting edge 2A on the X'Z plane is inclined with respect to the X' axis. An inclination angle of cutting edge 2A matches with target angle $\theta_S$.

An X axis component, a Y axis component, and a Z axis component of a difference between the final position and the initial position of rear end 3_5 of cutting edge 2A in the X'Y'Z coordinate system are expressed as ($\delta$X', $\delta$Y', $\delta$Z). $\delta$X', $\delta$Y', and $\delta$Z satisfy relation below.

$$\delta X'=R_{max}-R_{min}-L_{XY}\cos(\phi+\beta)$$

$$\delta Y'=L_{XY}\sin(\phi+\beta)$$

$$\delta Z=Z_{max}-Z_{min}$$

$\delta$X', $\delta$Y', and $\delta$Z are derived by substituting angle $\beta$ at $\delta$X, $\delta$Y, and $\delta$Z with ($\beta+\phi$).

Referring back to FIG. 22, an angle formed by the track of rear end 3_5 of cutting edge 2A with respect to the X' axis is denoted as $\gamma$. With the expressions above, an angle $\theta'_1$ is expressed as below.

$$\tan\gamma=\frac{\delta Y'}{\delta X'}=\frac{L_{XY}\sin(\phi+\beta)}{R_{max}-R_{min}-L_{XY}\cos(\phi+\beta)}$$

$$\theta'_1=\gamma+\phi$$

$\delta$X' is expressed in the original XY coordinate system as below.

$$\delta X=\delta X'\cos\phi-\delta Y'\sin\phi=(\cos\phi-\sin\phi\tan\gamma)\delta X'$$

Therefore, angle $\theta'_0$ is expressed as below.

$$\tan\theta'_0=\frac{\delta Z}{\delta X}=\frac{\delta Z}{\delta X'}\frac{1}{\cos\phi-\sin\phi\tan\gamma}=\frac{\tan\theta_s}{\cos\phi-\sin\phi\tan\gamma}$$

Figure 24:
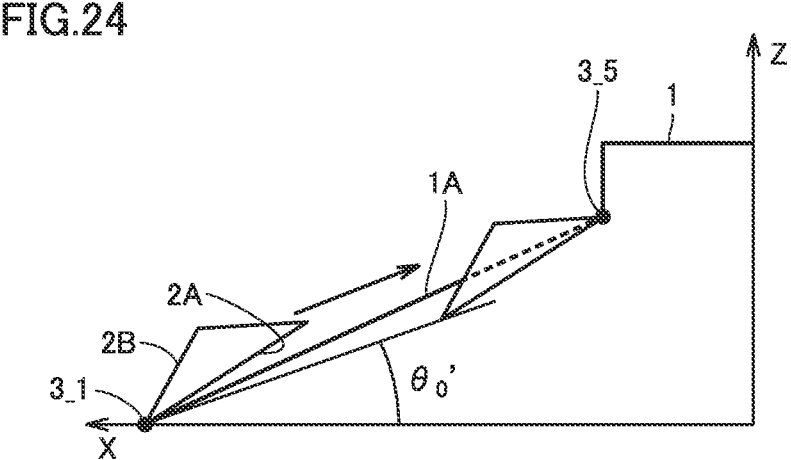
FIG. 24 is a diagram illustrating the corrected track of the cutting edge on the XZ plane.
Figure 25:
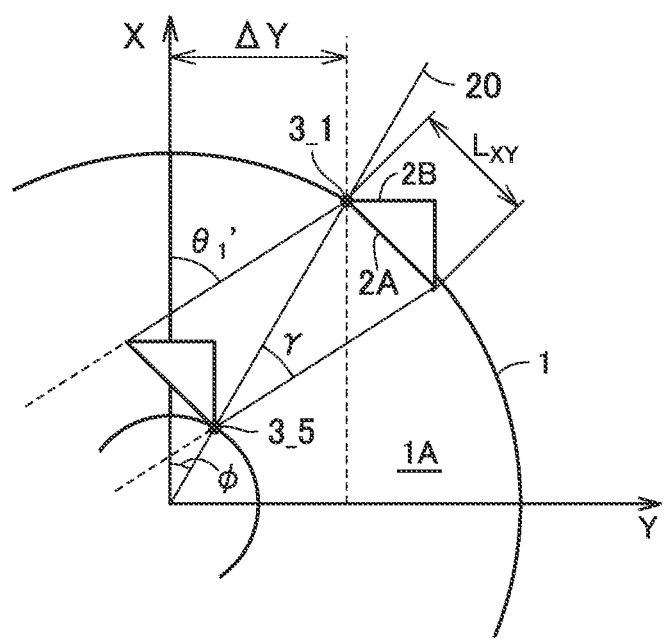
FIG. 25 is a diagram illustrating the corrected track of the cutting edge on the XY plane.

FIG. 24 is a diagram illustrating the corrected track of cutting edge 2A on the XZ plane. FIG. 25 is a diagram illustrating the corrected track of cutting edge 2A on the XY plane. Referring to FIGS. 24 and 25, angle $\theta'_0$ and angle $\theta'_1$ are angles used for a program for machining rotation symmetry plane 1A (a program angle) in manufacturing apparatus 100 (see FIG. 2). Angle $\gamma$ refers to an angle formed between a trace of cutting edge 2A and cutting line 20 on the XY plane. Angle $\phi$ refers to an angle formed between cutting line 20 and the X axis on the XY plane. Length $L_{XY}$ refers to a length of a projected image of cutting edge 2A on the XY plane.

Angle $\gamma$, angle $\phi$, and length $L_{XY}$ are expressed as below.

$$L_{XY}=L\sqrt{\frac{1+\tan^2\beta}{1+\tan^2\beta+\tan^2\theta}} \quad (1)$$

$$\frac{\cos(\beta+\phi)}{\cos\beta}=\frac{\tan\theta}{\tan\theta_s}$$

$$\therefore \phi=\cos^{-1}\left(\cos\beta\times\frac{\tan\theta}{\tan\theta_s}\right)-\beta \quad (2)$$

$$\tan\gamma=\frac{L_{XY}\sin(\beta+\phi)}{R_{max}-R_{min}-L_{XY}\cos(\beta+\phi)}$$

$$\therefore \gamma=\tan^{-1}\left(\frac{L_{XY}\sin(\beta+\phi)}{R_{max}-R_{min}-L_{XY}\cos(\beta+\phi)}\right) \quad (3)$$

Correction amount $\Delta$Y, $\tan\theta'_0$, and $\tan\theta'_1$ are found from angle $\gamma$ and angle $\phi$ in accordance with the following expressions.

$$\Delta Y=R_{max}\sin\phi \quad (4)$$

$$\tan\theta'_1=\tan(\phi+\gamma) \quad (5)$$

$$\tan\theta'_0=\frac{\tan\theta_s}{\cos\phi-\sin\phi\tan\gamma} \quad (6)$$

(2) Results of Machining

Figure 26:
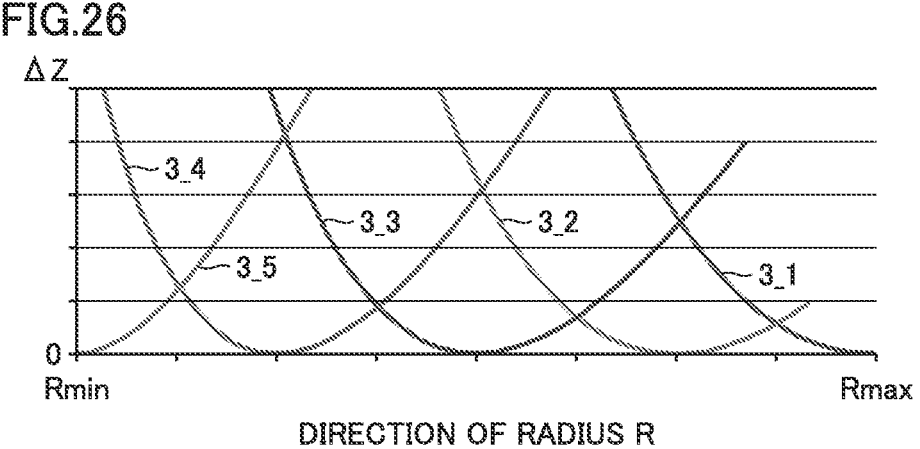
FIG. 26 is a diagram showing results of calculation of a machined shape on the RZ plane (corrected track) when an angle of the cutting edge is smaller than a target angle.
Figure 27:
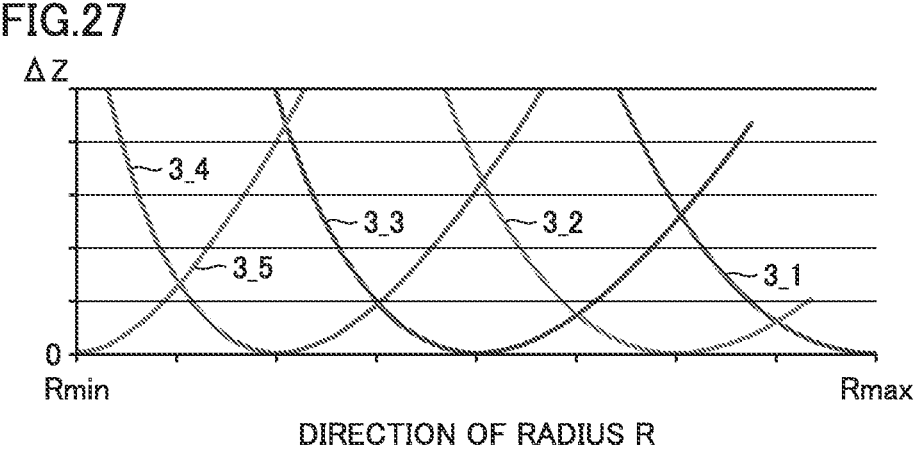
FIG. 27 is a diagram showing results of calculation of a machined shape on the RZ plane (corrected track) when an angle of the cutting edge is smaller than a target angle.

FIG. 26 is a diagram showing results of calculation of a machined shape on the RZ plane when angle $\theta$ of cutting edge 2A is greater than target angle $\theta_S$. FIG. 27 is a diagram showing results of calculation of a machined shape on the RZ plane when angle $\theta$ of cutting edge 2A is smaller than target angle $\theta_S$. FIGS. 26 and 27 show traces of tip end 3_1, rear end 3_5, and regions 3_2, 3_3, and 3_4 of cutting edge 2A. In any of an example in which angle $\theta$ is greater than target angle $\theta_S$ and an example in which angle $\theta$ is smaller than target angle $\theta_S$, $\Delta$Z can be maintained at 0 during a period from start of cutting until end of cutting. According to the first embodiment of the present invention, rotation symmetry plane 1A can be machined such that ridgeline 1B forms target angle $\theta_S$ with respect to the XY plane.

According to the first embodiment of the present invention, so long as angle $\theta$ and angle $\beta$ of cutting edge 2A each maintain the same value, further correction of the cutting start position and the track is not necessary. Since holder 2 is constructed to prevent rotation of cutting edge 2, angle $\theta$ and angle $\beta$ of cutting edge 2A can be maintained. By feeding cutting edge 2A from the set cutting start position along the track, a highly accurate machine component can repeatedly be manufactured. As described previously, in the embodiment of the present invention, individual regions of linear cutting edge 2A successively come in contact with rotation symmetry plane 1A during a period from start of cutting until end of cutting. Therefore, surface roughness of rotation symmetry plane 1A and lifetime of the cutting edge are also excellent.

Figure 28:
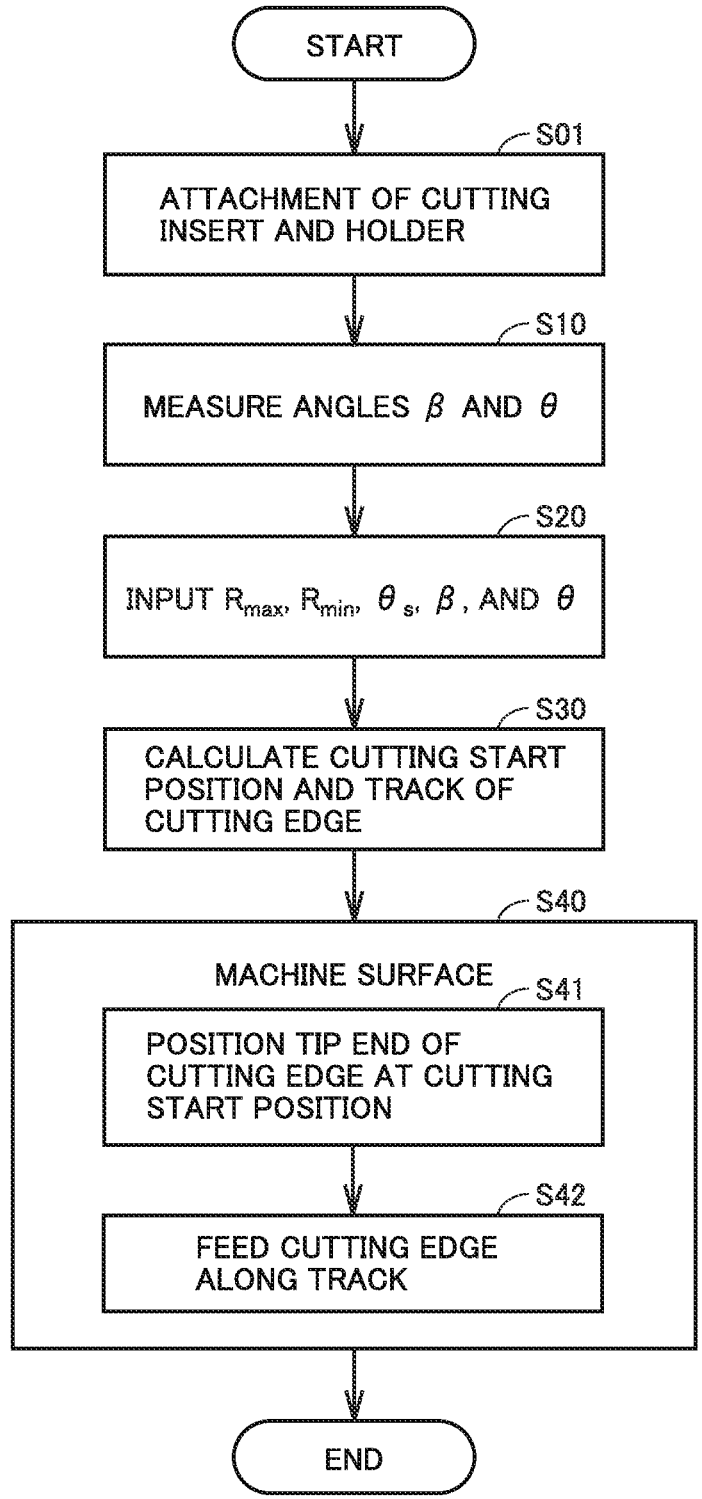
FIG. 28 is a flowchart showing the manufacturing method according to the first embodiment of the present invention.

FIG. 28 is a flowchart showing the manufacturing method according to the first embodiment of the present invention. As shown in FIG. 28, in step S01, cutting insert 2B is attached to holder 2. Holder 2 is attached to manufacturing apparatus 100 (feed mechanism 106).

In step S10, angle β and angle θ are measured. Since various known methods can be used for measuring angle β and angle θ, detailed description will not be repeated here. For example, angle β and angle θ are measured with a measurement instrument such as a dial gauge or a presetter.

Processing in steps S20 to S40 is performed as control unit 104 reads a program stored in storage unit 103. In step S20, control unit 104 controls display unit 102 to have the display portion show a screen inviting a user to enter a value necessary for machining rotation symmetry plane 1A. The user enters values for maximum radius $R_{max}$, minimum radius $R_{min}$, angle $\theta_S$, angle β, angle θ, and length L into input unit 101 by operating input unit 101. Input unit 101 accepts the values. A value accepted by input unit 101 is stored, for example, in storage unit 103. A value accepted by input unit 101 may be stored in control unit 104 or in both of storage unit 103 and control unit 104.

In step S30, control unit 104 calculates the cutting start position and the track of cutting edge 2A. For example, operation unit 110 calculates $\Delta Y$, $\tan \theta'_0$, and $\tan \theta'_1$. Specifically, operation unit 110 calculates length $L_{XY}$, angle γ, and angle φ in accordance with the expression (1) to the expression (3) described above. Operation unit 110 calculates $\Delta Y$, $\tan \theta'_0$, and $\tan \theta'_1$ in accordance with the expression (4) to the expression (6) described above. $\Delta Y$, $\tan \theta'_0$, and $\tan \theta'_1$ are stored in storage unit 103. Depending on contents of a program, angle $\theta'_0$ and/or angle $\theta'_1$ may be stored in storage unit 103.

In step S40, rotation symmetry plane 1A is machined. Control unit 104 controls feed mechanism 106 by controlling drive unit 105. Thus, feed of holder 2 is controlled. Control unit 104 controls feed of cutting edge 2A.

Initially, control unit 104 positions tip end 3_1 of cutting edge 2A at the cutting start position ($R_{max}$, $\Delta Y$, $Z_{min}$) (step S41). Then, control unit 104 feeds cutting edge 2A such that the position of tip end 3_1 of cutting edge 2A is varied along the track ($R_{max}-t$, $\Delta Y-t \times \tan \theta'_1$, $Z_{min}+t \times \tan \theta'_0$) (step S42). In step S42, control unit 104 moves cutting edge 2A such that tip end 3_1 of cutting edge 2A is located at a coordinate determined by variable t while variable t is varied from 0 to ($R_{max}-R_{min}$).

In machining for a second time and later, processing in step S40 is repeated. Control unit 104 reads $\Delta Y$, $\tan \theta'_0$, and $\tan \theta'_1$ from storage unit 103 and performs the processing in steps S41 and S42. While the same processing is repeated, control unit 104 may store $\Delta Y$, $\tan \theta'_0$, and $\tan \theta'_1$.

According to the flow shown in FIG. 28, control unit 104 calculates $\Delta Y$, $\tan \theta'_0$, and $\tan \theta'_1$ before the processing in step S40 and then calculates the cutting start position and the track. Control unit 104, however, may calculate correction amount $\Delta Y$ in step S41 and may calculate $\tan \theta'_0$, and $\tan \theta'_1$ in step S42. The cutting start position and the track may be calculated in a step where they are necessary.

After step S40 or before step S01, a further step necessary for manufacturing machine component 1 may be performed. For example, after step S40, an inspection step for inspecting machine component 1 may be performed.

A computer which performs the processing in step S20 and step S30 is not limited to control unit 104 of manufacturing apparatus 100. A computer provided outside manufacturing apparatus 100 may perform the processing in step S20 and step S30. In this case, a step of receiving $\Delta Y$, $\tan \theta'_0$, and $\tan \theta'_1$ can be added before step S40. For example, various known means such as an operation of input unit 101 by a user or transfer of data through a communication line can be applied to input of $\Delta Y$, $\tan \theta'_0$, and $\tan \theta'_1$ to control unit 104.

Calculation of the cutting start position and the track according to the first embodiment of the present invention can include an example in which a condition of $\theta=\theta_S$ is satisfied. When a condition of $\theta=\theta_S$ is satisfied, a condition of $\theta'_0=\theta_0$ and $\theta'_1=\theta_1$ is satisfied. According to the embodiment of the present invention, the cutting start position and the track can be calculated not only in an example in which angle θ is different from target angle $\theta_S$ but also in an example in which angle θ is equal to target angle $\theta_S$. In the first embodiment of the present invention, the cutting start position and the track can be calculated based on measured values of angles θ and β and predetermined values (length L of cutting edge 2A, maximum radius $R_{max}$ of rotation symmetry plane 1A, minimum radius $R_{min}$ of rotation symmetry plane 1A, and target angle $\theta_S$).

The cutting start position and the track may calculated by using angle $\theta_a$ shown in FIG. 1 instead of target angle $\theta_S$. Ideally, a condition of $\theta_a+\theta_S=90°$ is satisfied. Therefore, angle $\theta_S$ can be substituted with ($90-\theta_a$). In a plane determined by two of the X axis, the Y axis, and the Z axis, an inclination angle with respect to one axis can be substituted with an inclination angle with respect to the other axis. In that case as well, the expression (1) to the expression (6) can be derived.

(Second Embodiment)

Figure 29:
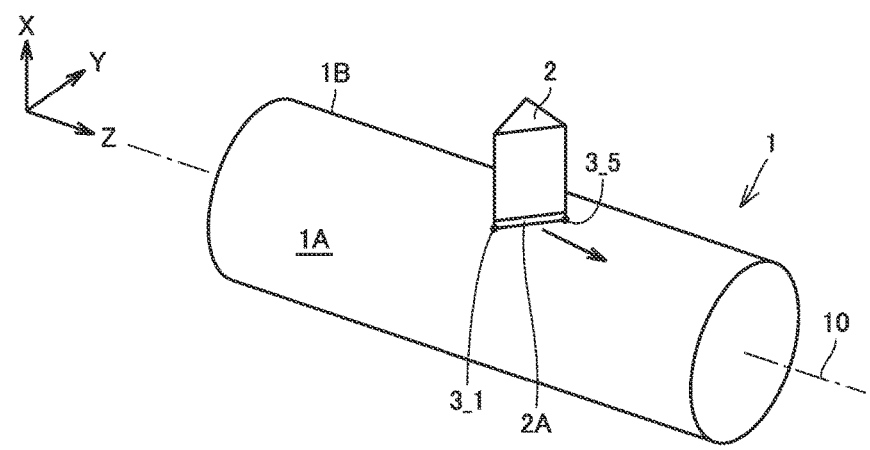
FIG. 29 is a perspective view showing a manufacturing method according to a second embodiment of the present invention.

FIG. 29 is a perspective view showing a manufacturing method according to a second embodiment of the present invention. In this embodiment, machine component 1 is columnar. A side surface of a column is defined as rotation symmetry plane 1A. Rotation symmetry plane 1A is defined by a generatrix in parallel to axial line of rotation 10. The generatrix corresponds to ridgeline 1B. A surface formed by rotating the generatrix around axial line of rotation 10 is rotation symmetry plane 1A.

For example, a shaft is defined as machine component 1. A type of machine component 1, however, is not particularly limited. The column shown in FIG. 29 may be part of machine component 1. Machine component 1 may be hollow. Machine component 1 may be cylindrical.

Since the configuration of the manufacturing apparatus according to the second embodiment of the present invention is similar to the configuration shown in FIG. 2, further description will not be repeated. The manufacturing method, in particular, machining of the rotation symmetry plane, according to the second embodiment of the present invention will be described below in detail.

1. Definition of Parameters

Figure 30:
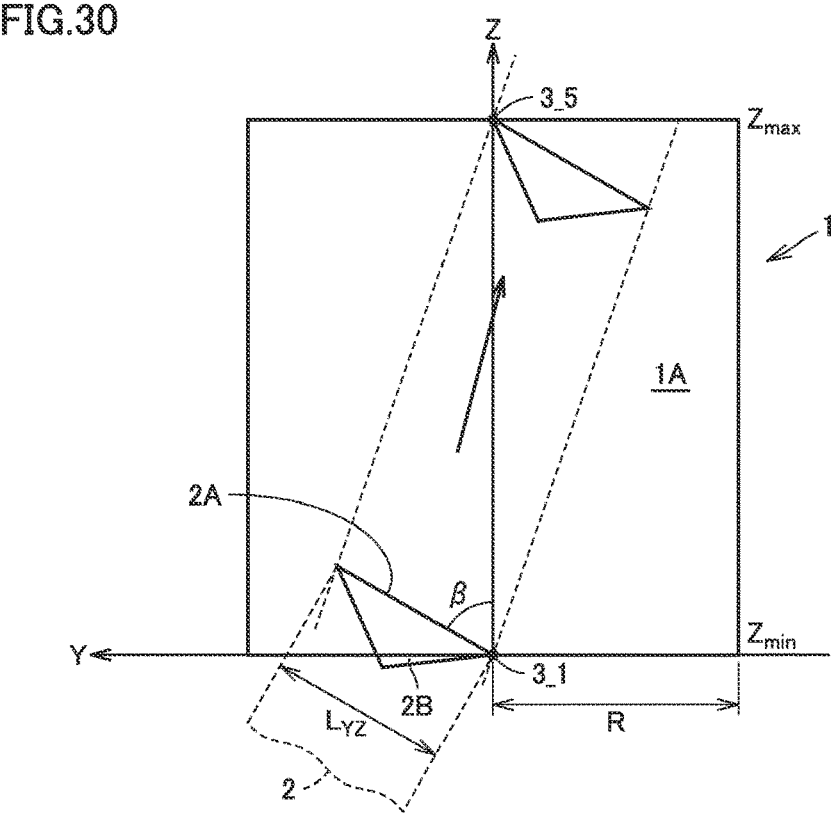
FIG. 30 is a schematic diagram schematically showing the cutting edge projected on a YZ plane.

FIG. 30 is a schematic diagram schematically showing cutting edge 2A projected on the YZ plane. As shown in FIG. 30, angle β ($=\theta_{YZ}$) represents an inclination angle formed by cutting edge 2A with respect to the Z axis in the YZ plane (a first inclination angle). $L_{YZ}$ represents a length of a projection of cutting edge 2A on the YZ plane. R represents a radius of rotation symmetry plane 1A. $Z_{max}$ represents a maximum value of a Z coordinate of rotation symmetry plane 1A. $Z_{min}$ represents a minimum value of the Z coordinate of rotation symmetry plane 1A. $Z=Z_{min}$ is defined as a position of the origin of the Z axis. A condition of $Z_{min}=0$ is satisfied. $Z_{max}$ is also called a height of machine component 1 below.

Angle β may be defined as an inclination angle of holder 2 formed with respect to the Z axis in the YZ plane. Angle β can be defined as an inclination of holder 2 from a state that an angle formed by cutting edge 2A with respect to the Z axis is 90°. In attaching holder 2 to feed mechanism 106, holder 2 can rotate in the YZ plane around an axis of rotation in parallel to the X axis. After holder 2 is attached to feed mechanism 106, holder 2 cannot rotate along the axis of rotation in parallel to the X axis.

Figure 31:
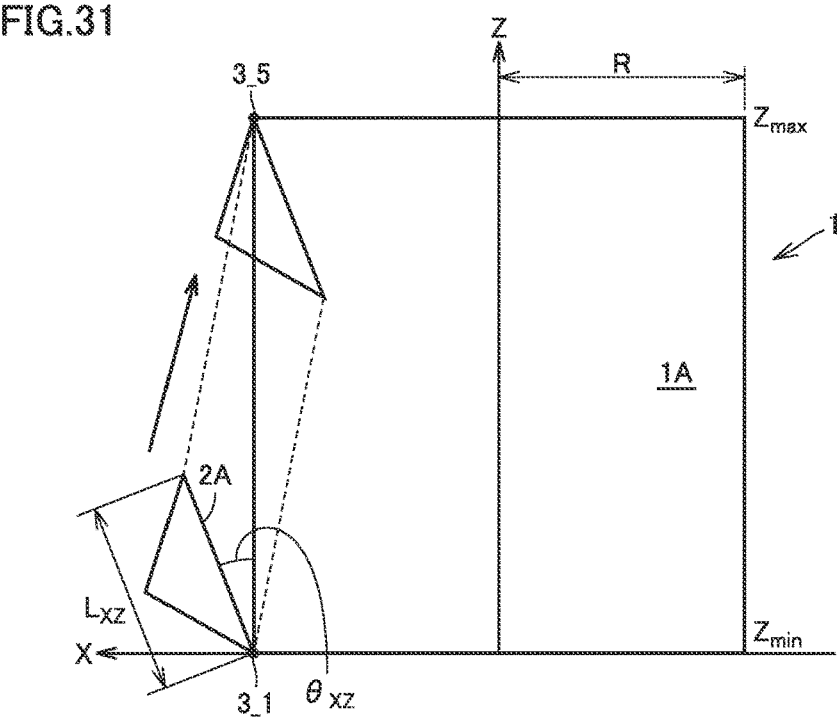
FIG. 31 is a schematic diagram schematically showing the cutting edge projected on the XZ plane.

FIG. 31 is a schematic diagram schematically showing cutting edge 2A projected on the XZ plane. As shown in FIG. 31, an angle $\theta_{XZ}$ represents an inclination angle formed by cutting edge 2A with respect to the Z axis (a second inclination angle) on the XZ plane. Cutting insert 2B is attached to holder 2 such that angle $\theta_{XZ}$ is as close as possible to 0°. $L_{XZ}$ represents a length of a projected image of cutting edge 2A on the XZ plane.

Figure 32:
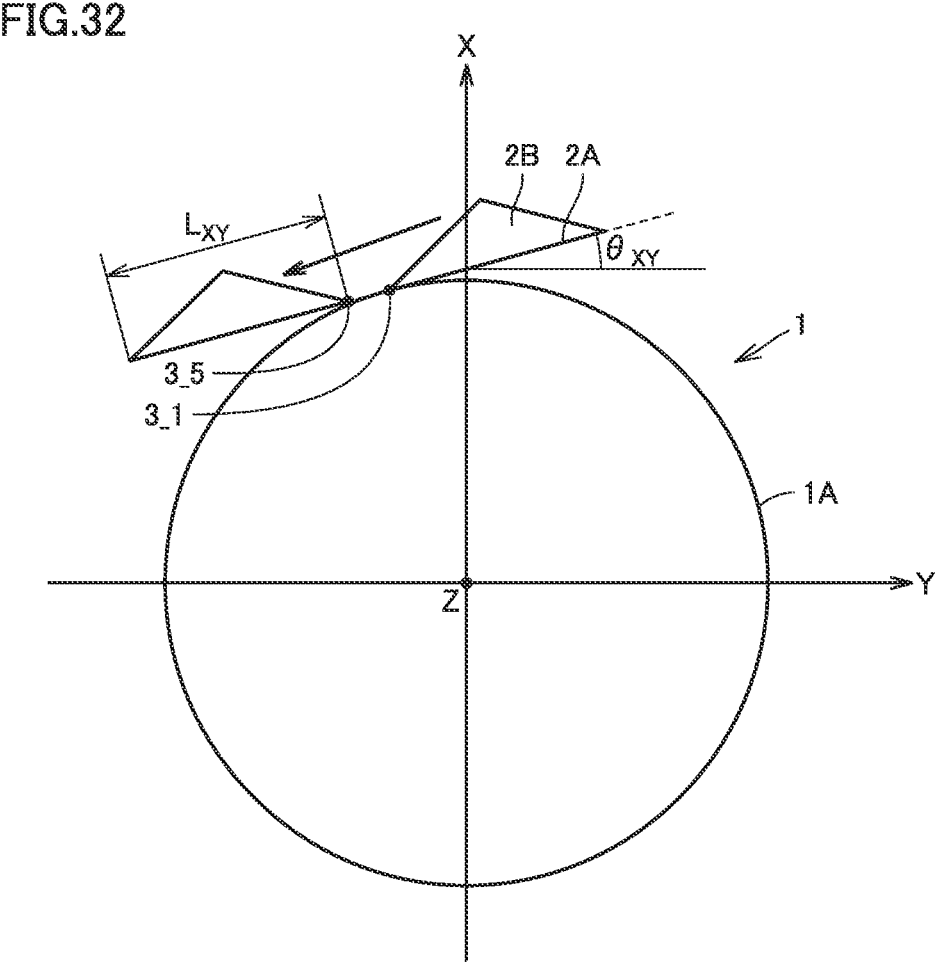
FIG. 32 is a schematic diagram schematically showing the cutting edge projected on the XY plane.

FIG. 32 is a schematic diagram schematically showing cutting edge 2A projected on the XY plane. As shown in FIG. 32, an angle $\theta_{XY}$ represents an inclination angle formed by cutting edge 2A with respect to the Y axis in the XY plane. $L_{XY}$ represents a length of a projected image of cutting edge 2A on the XY plane.

A circle shown in FIG. 32 represents rotation symmetry plane 1A projected on the XY plane. Cutting edge 2A moves over the XY plane along a tangent to the circle. A position of tip end 3_1 of cutting edge 2A at the time of start of cutting corresponds to a point of tangency to the circle.

In FIGS. 30 to 32, a condition of $\beta>0$, $\theta_{XZ}>0$, and $\theta_{XY}>0$ is satisfied. An angle $\theta_{XZ}$ may have a negative value ($\theta_{XZ}<0$) based on attachment of cutting insert 2B to holder 2.

An X-axis component, a Y axis component, and a Z axis component of a difference between the initial position of tip end 3_1 of cutting edge 2A and the initial position of rear end 3_5 of cutting edge 2A are expressed as (dX, dY, dZ). Signs for angles $\theta_{XY}$, $\theta_{XZ}$, and $\theta_{YZ}$ are defined so as to satisfy relational expressions below.

$$dY = dZ \tan \theta_{YZ} = dZ \tan \beta$$

$$dX = dZ \tan \theta_{XZ}$$

$$dX = dY \tan \theta_{XY}$$

Angles $\theta_{XY}$, $\theta_{XZ}$, and $\theta_{YZ}$ (=$\beta$) satisfy relation below.

$$\tan\theta_{XY} = \frac{\tan\theta_{XZ}}{\tan\theta_{YZ}} = \frac{\tan\theta_{XZ}}{\tan\beta}$$

As is clear from $\tan \theta_{XY} = \tan \theta_{XZ}/\tan \beta$, angle $\theta_{XY}$ of cutting edge 2A in the XY plane can be found based on angles $\theta_{XZ}$ and $\beta$. Therefore, it is not essential to input angle $\theta_{XY}$ into manufacturing apparatus 100.

$L_{YZ}$, $L_{XZ}$, and $L_{XY}$ are expressed in accordance with expressions below:

$$dX^2 + dY^2 + dZ^2 = L^2$$

$$L_{XY} = \sqrt{dX^2 + dY^2} = L\sqrt{\frac{\tan^2\theta_{XZ} + \tan^2\beta}{1 + \tan^2\theta_{XZ} + \tan^2\beta}}$$

$$L_{YZ} = \sqrt{dY^2 + dZ^2} = L\sqrt{\frac{1 + \tan^2\beta}{1 + \tan^2\theta_{XZ} + \tan^2\beta}}$$

$$L_{XZ} = \sqrt{dX^2 + dZ^2} = L\sqrt{\frac{1 + \tan^2\theta_{XZ}}{1 + \tan^2\theta_{XZ} + \tan^2\beta}}$$

where L represents a length of cutting edge 2A.

Angle $\beta$ can be set from a point of view of a contact resistance and surface roughness. FIG. 33 is a diagram for illustrating angle $\beta$ of the cutting edge on the YZ plane. Referring to FIG. 33, when cutting edge 2A is projected on the RZ plane, the projected image is curved. The "RZ plane" refers to a plane defined by a radius (R) and an axial line of rotation (Z) of rotation symmetry plane 1A.

As angle $\beta$ is greater, a curvature of a projected image of cutting edge 2A is smaller and hence a width of cutting is greater. As angle $\beta$ is smaller, a curvature of a projected image of cutting edge 2A is greater and hence a width of cutting is smaller.

When angle $\beta$ is great, a width of cutting is great and hence a contact resistance of cutting edge 2A is high. On the other hand, surface roughness of the machined surface is less. In contrast, when angle $\beta$ is small, a width of cutting is small and hence a contact resistance of cutting edge 2A is low. Surface roughness of the machined surface, however, is great.

By varying angle $\beta$ as above, a contact resistance and surface roughness will vary. There is a trade-off between a contact resistance and surface roughness. Therefore, angle $\beta$ can be determined such that both of the contact resistance and surface roughness are at required levels.

When angle $\beta$ is set to 0°, cutting edge 2A is oriented in a direction perpendicular to the direction of rotation of machine component 1 and hence the contact resistance is high. When angle $\beta$ is set to 90°, cutting edge 2A is oriented to the direction of rotation of machine component 1 and hence machining of machine component 1 becomes difficult. Therefore, in the embodiment, angle $\beta$ is determined to satisfy a condition of $0°<\beta<90°$. Angle $\beta$ preferably satisfies a condition of $20°\leq\beta<70°$. Angle $\beta$ more preferably satisfies a condition of $30°\leq\beta\leq60°$ and angle $\beta$ is further preferably set to 45°.

2. Example of Non-Corrected Track

When cutting edge 2A is fed along the non-corrected track, angle $\theta_{XZ}$ should match with 0° in the projected image of cutting edge 2A on the XZ plane. In order to satisfy this condition, an angle of cutting edge 2A should be adjusted such that angle $\theta_{XZ}$ is equal to 0° when holder 2 is attached to feed mechanism 106. For example, the method exemplified in the first embodiment is applied.

(1) Track

Figure 34:
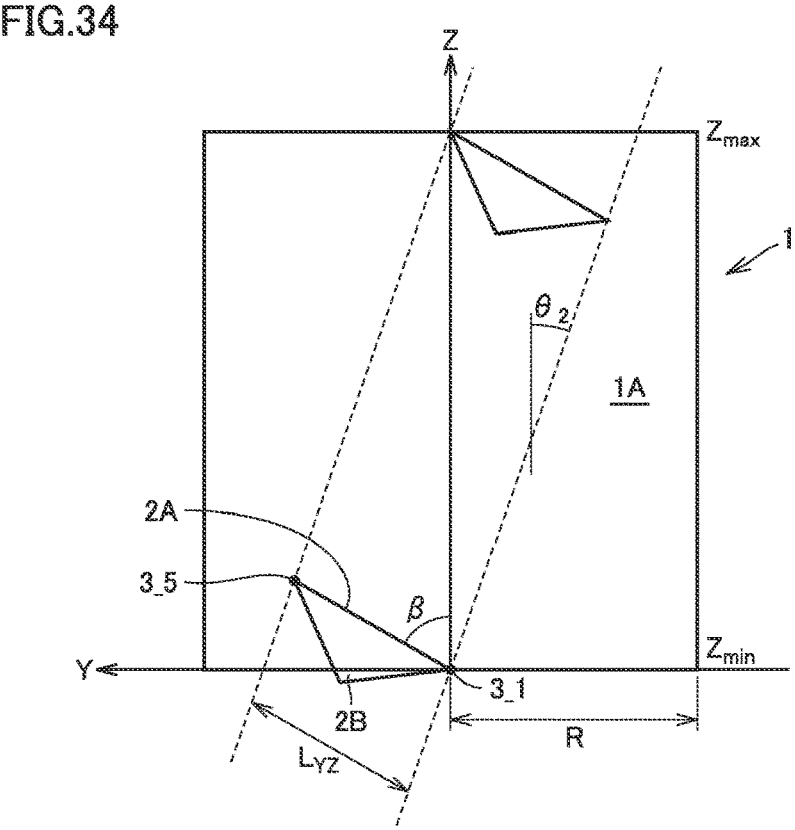
FIG. 34 is a YZ plane view for illustrating a method for machining a machine component in the example of the non-corrected track.
Figure 35:
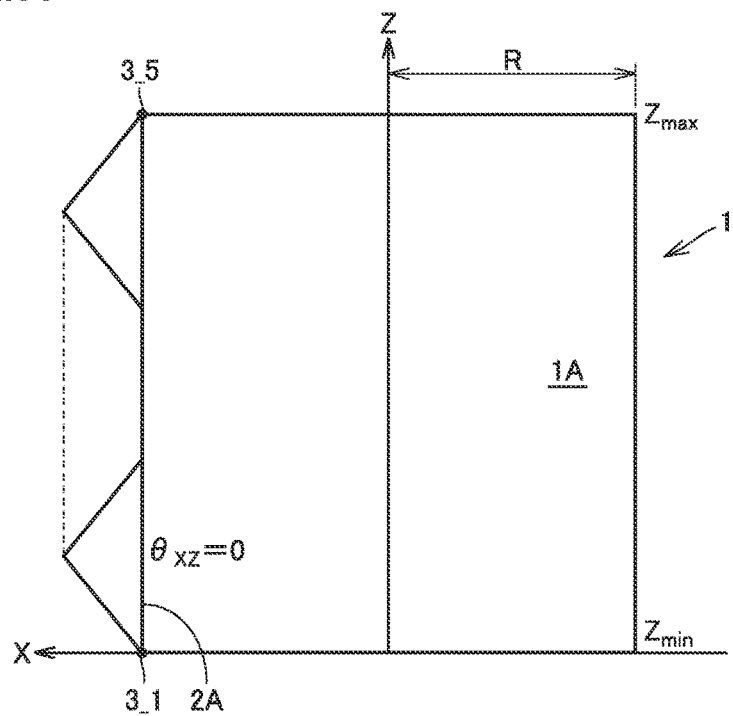
FIG. 35 is an XZ plane view for illustrating the method for machining a machine component in the example of the non-corrected track.

FIG. 34 is a YZ plane view for illustrating a method for machining machine component 1 in an example of the non-corrected track. FIG. 35 is an XZ plane view for illustrating a method for machining machine component 1 in the example of the non-corrected track.

As shown in FIG. 34, initially, tip end 3_1 of cutting edge 2A is positioned at the cutting start position. As shown in FIGS. 34 and 35, the cutting start position in the example of the non-corrected track is set to the origin in the three-dimensional orthogonal coordinate system.

Rotation symmetry plane 1A is machined by feeding cutting edge 2A as being in contact with rotating machine component 1. As shown in FIG. 35, the projected image of cutting edge 2A on the XZ plane is in parallel to the Z axis (that is, $\theta_{XZ}=0$).

Cutting edge 2A linearly moves in the XZ plane and linearly moves in the YZ plane. In the description below, the term "XZ program angle" means an angle formed between the direction of movement of cutting edge 2A in the XZ plane and the Z axis. The term "YZ program angle" means an angle formed between the direction of movement of cutting edge 2A in the YZ plane and the Z axis.

An XZ program angle and a YZ program angle in the example of the non-corrected track are expressed as $\theta_1$ and $\theta_2$, respectively. Angles $\theta_1$ and $\theta_2$ can be expressed in accordance with expressions below.

$$\theta_1 = 0$$

$$\tan\theta_2 = \frac{L_{YZ}\sin\beta}{Z_{max} - Z_{min} - L_{YZ}\cos\beta}$$

Figure 36:
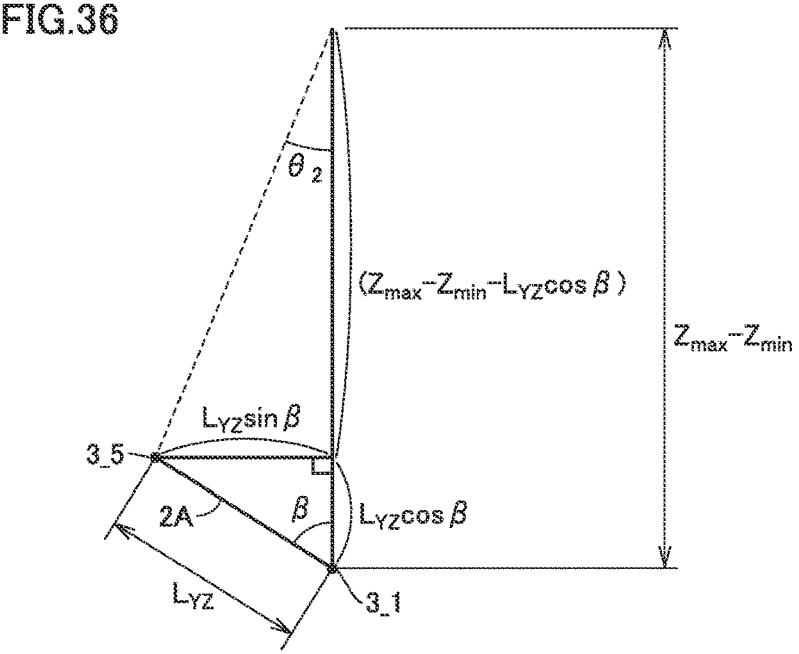
FIG. 36 is a diagram for illustrating relation between a program angle and a first inclination angle on the YZ plane.

FIG. 36 is a diagram for illustrating relation between program angle $\theta_2$ and first inclination angle 3 on the YZ plane. FIG. 36 shows a triangle. One side of the triangle has a length $Z_{max}$. Another side of the triangle corresponds to cutting edge 2A. Therefore, a length of that side is expressed with $L_{YZ}$. An angle formed between these two sides is expressed as $\beta$.

A normal is drawn from rear end 3_5 of cutting edge 2A onto a side having a length $Z_{max}-Z_{min}$. This normal has a length $L_{YZ} \sin \beta$. Therefore, relation of $\tan \theta_2 = (L_{YZ} \sin \beta)/(Z_{max}-Z_{min}-L_{YZ} \cos \beta)$ is satisfied.

Figure 37:
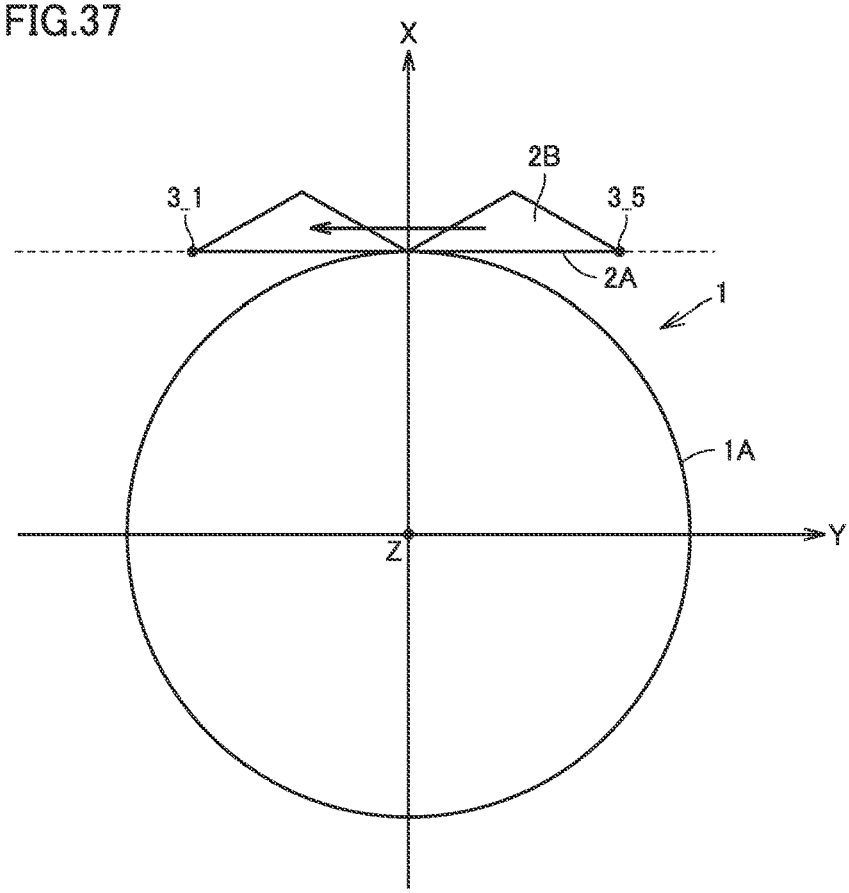
FIG. 37 is an XY plane view for illustrating a method for machining a machine component in the example of the non-corrected track.

FIG. 37 is an XY plane view for illustrating a method for machining machine component 1 in the example of the non-corrected track. Referring to FIG. 37, since a condition of $\theta_{XY}=0$ is satisfied, cutting edge 2A moves in parallel to the Y axis.

When the track is not corrected, machine component 1 is machined in accordance with a procedure below.

(a) Cutting insert 2B is attached to holder 2 such that an inclination angle of cutting edge 2A in the XZ plane is set to 0° and holder 2 is attached to feed mechanism 106.

(b) Program angle $\theta_2$ is calculated ($\theta_{XZ}=0$).

(c) Tip end 3_1 of cutting edge 2A is positioned at the cutting start position (X, Y, Z)=(R, 0, $Z_{min}$).

(d) The coordinate of tip end 3_1 of the cutting edge is moved along the track (X, Y, Z)=(R, $-t\times\tan \theta_2$, $Z_{min}+t$). t represents a variable which varies from 0 to ($Z_{max}-Z_{min}$). Since the X axis component of the track is constant, cutting edge 2A moves in parallel to the Y axis on the XY plane.

(2) Results of Machining

Figure 38:
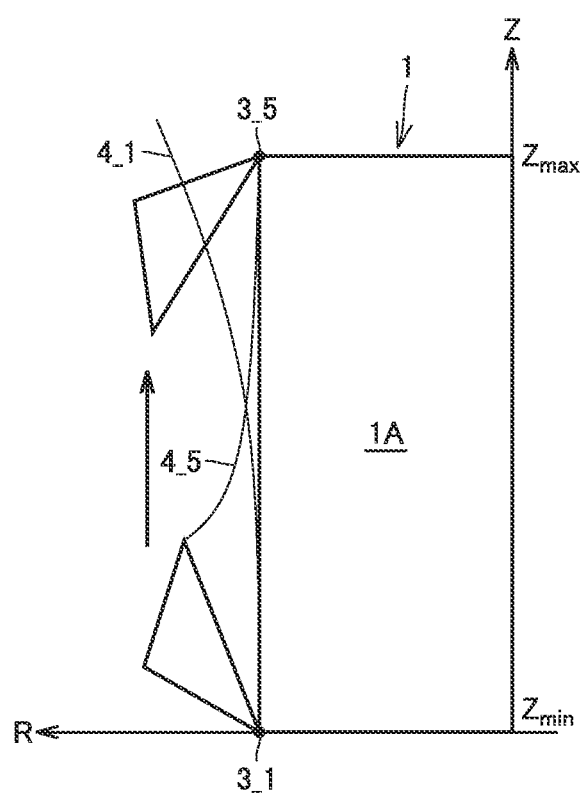
FIG. 38 is a schematic diagram schematically showing traces of the tip end and the rear end of the cutting edge on the RZ plane.

FIG. 38 is a schematic diagram schematically showing traces of the tip end and the rear end of cutting edge 2A on the RZ plane. FIG. 38 shows trace 4_1 drawn by tip end 3_1 of cutting edge 2A and trace 4_5 drawn by rear end 3_5 of cutting edge 2A. A machined shape in the RZ plane corresponds to an envelope of the trace drawn by each region of cutting edge 2A on the RZ plane.

Figure 39:
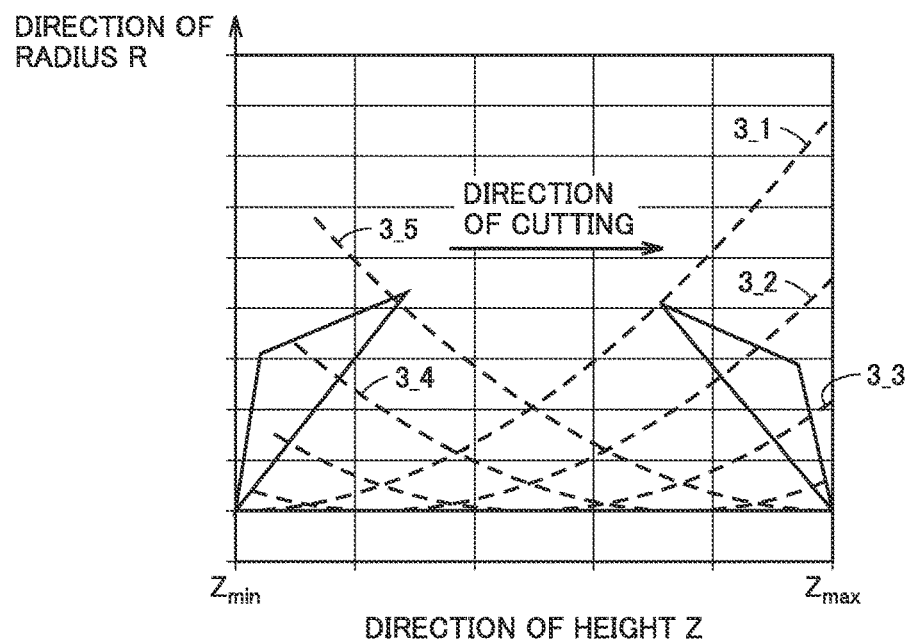
FIG. 39 is a diagram showing results of calculation of a machined shape on the RZ plane when a second inclination angle of the cutting edge is equal to 0°.
Figure 40:
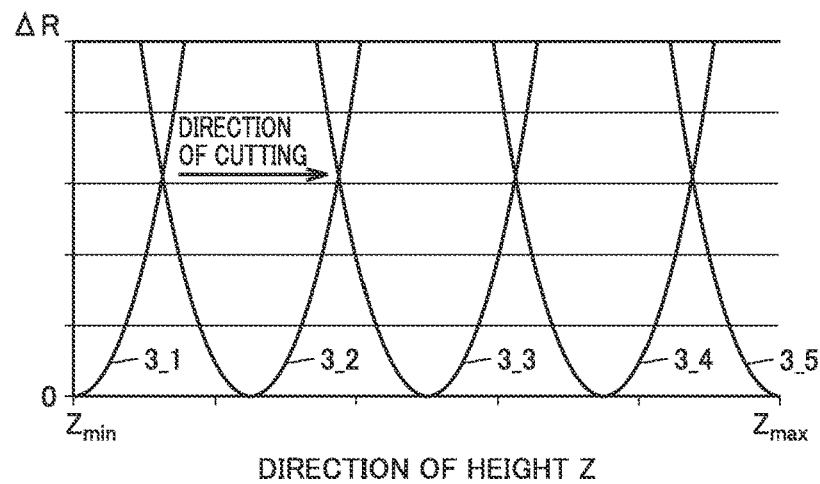
FIG. 40 is a diagram representing a difference in a direction of an R axis between a machined surface and a surface as designed, based on the results of calculation shown in FIG. 39.

FIG. 39 is a diagram showing results of calculation of a machined shape on the RZ plane when second inclination angle $\theta_{XZ}$ of cutting edge 2A is equal to 0°. FIG. 40 is a diagram representing a difference $\Delta R$ in a direction of an R axis between a machined surface and a surface as designed, based on the results of calculation shown in FIG. 39. Curves in the graph are brought in correspondence with tip end 3_1, rear end 3_5, and regions 3_2 to 3_4 of cutting edge 2A (see FIG. 12), respectively. As shown in FIGS. 39 and 40, when angle $\theta_{XZ}$ is equal to 0°, a condition of $\Delta R=0$ is satisfied. A surface as designed can be formed through cutting and machining.

Figure 41:
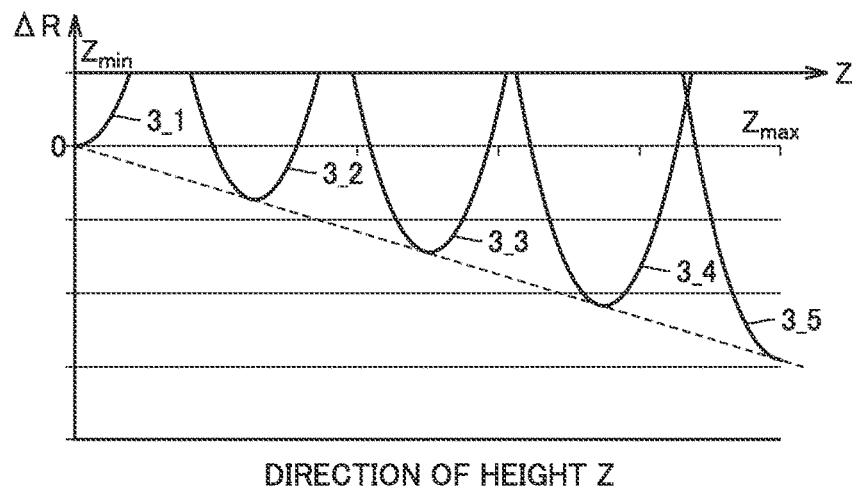
FIG. 41 is a diagram showing results of calculation of a machined shape on the RZ plane (non-corrected track) when the second inclination angle of the cutting edge is smaller than 0°.
Figure 42:
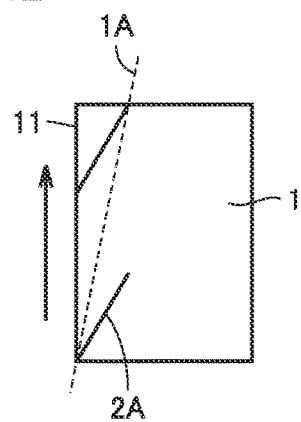
FIG. 42 is a diagram representing a difference in the direction of the R axis between the machined surface (rotation symmetry plane) and the surface as designed, based on the results of calculation shown in FIG. 41.

FIG. 41 is a diagram showing results of calculation of a machined shape on the RZ plane when second inclination angle $\theta_{XZ}$ of cutting edge 2A is smaller than 0°. FIG. 42 is a diagram representing difference $\Delta R$ in the direction of the R axis between the machined surface (rotation symmetry plane 1A) and surface 11 as designed, based on the results of calculation shown in FIG. 41. As shown in FIGS. 41 and 42, when a condition of $\theta_{XZ}<0$ is satisfied, $\Delta R$ increases in the negative direction with increase in Z. When the condition of $\theta_{XZ}<0$ is satisfied, cutting is excessive.

Figure 43:
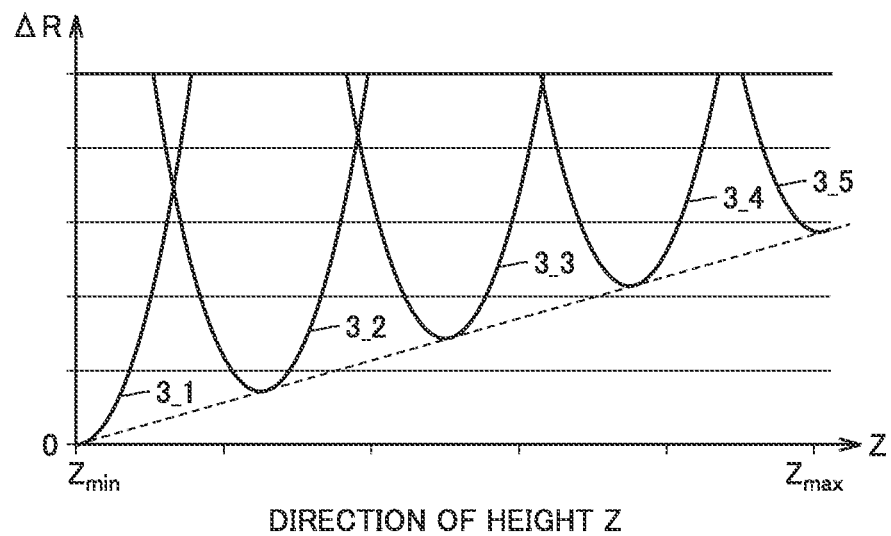
FIG. 43 is a diagram showing results of calculation of a machined shape on the RZ plane (non-corrected track) when the second inclination angle of the cutting edge is greater than 0°.
Figure 44:
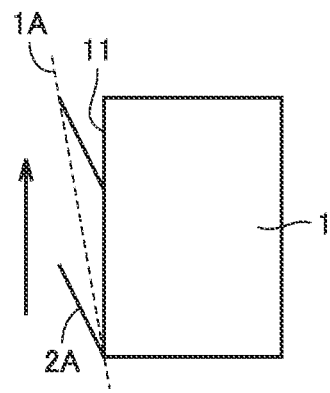
FIG. 44 is a diagram representing a difference in the direction of the R axis between the machined surface (rotation symmetry plane) and the surface as designed, based on the results of calculation shown in FIG. 43.

FIG. 43 is a diagram showing results of calculation of a machined shape on the RZ plane when second inclination angle $\theta_{XZ}$ of cutting edge 2A is greater than 0°. FIG. 44 is a diagram representing difference $\Delta R$ in the direction of the R axis between the machined surface (rotation symmetry plane 1A) and surface 11 as designed, based on the results of calculation shown in FIG. 43. As shown in FIGS. 43 and 44, when a condition of $\theta_{XZ}>0$ is satisfied, $\Delta R$ increases in the positive direction with increase in Z. When the condition of $\theta_{XZ}>0$ is satisfied, an unmachined portion remains. The abscissa in FIGS. 41 and 43 shows a position in the direction of the Z axis with $Z_{min}$ being defined as the reference.

As shown in FIGS. 40 to 44, in order to form a surface as designed through cutting and machining, angle $\theta_{XZ}$ of cutting edge 2A should match with 0°. Actually, however, it is often difficult to match angle $\theta_{XZ}$ of cutting edge 2A with 0°. When angle $\theta_{XZ}$ of cutting edge 2A is displaced from 0°, an unmachined portion of an object to be machined remains or cutting thereof is excessive.

3. Corrected Cutting Start Position and Corrected Track

In the second embodiment of the present invention, the cutting start position and the track are corrected in accordance with angle $\beta$ and angle $\theta_{XZ}$ of cutting edge 2A.

(1) Correction of Cutting Start Position and Track

Figure 45:
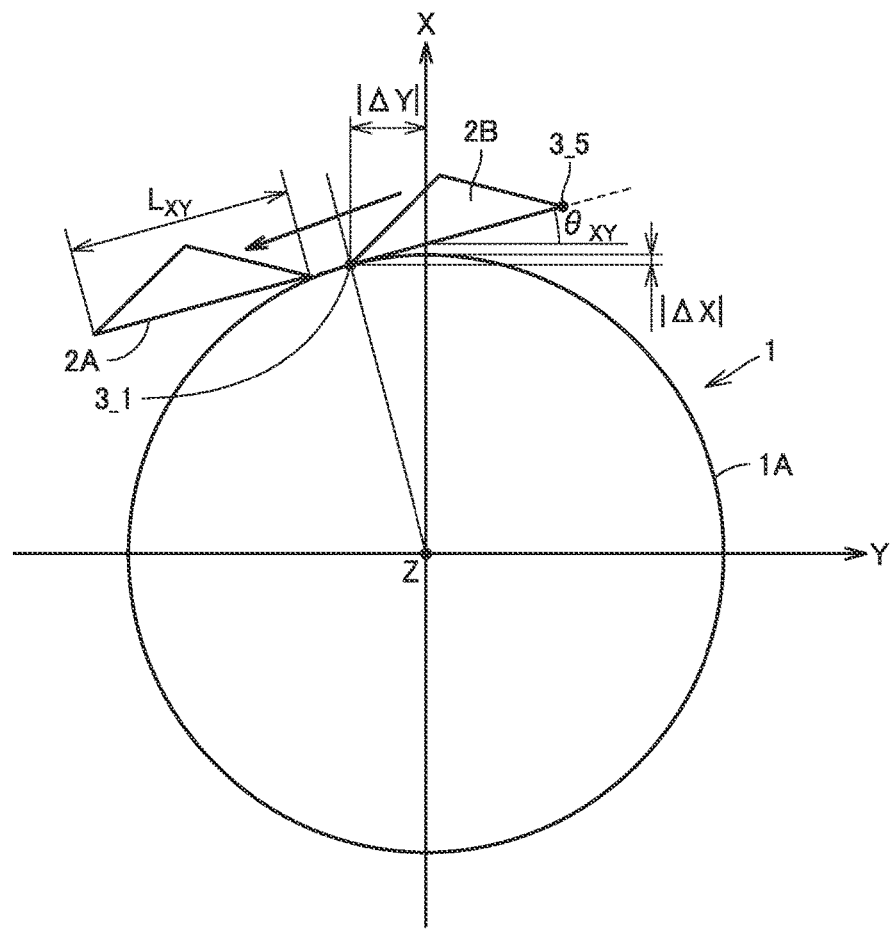
FIG. 45 is an XY plane view for schematically illustrating the manufacturing method according to the second embodiment of the present invention.
Figure 46:
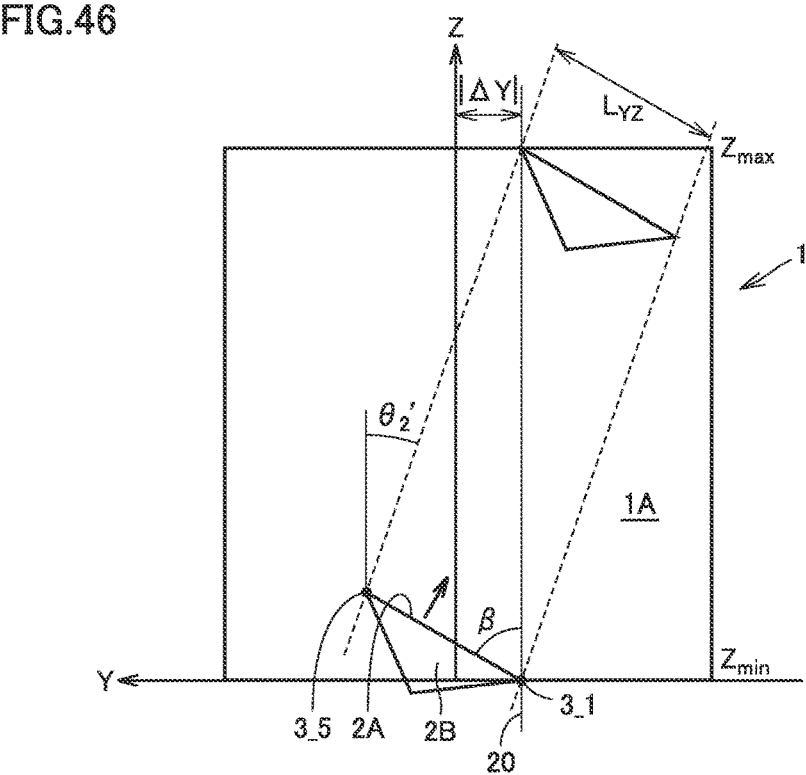
FIG. 46 is a YZ plane view for schematically illustrating the manufacturing method according to the second embodiment of the present invention.
Figure 47:
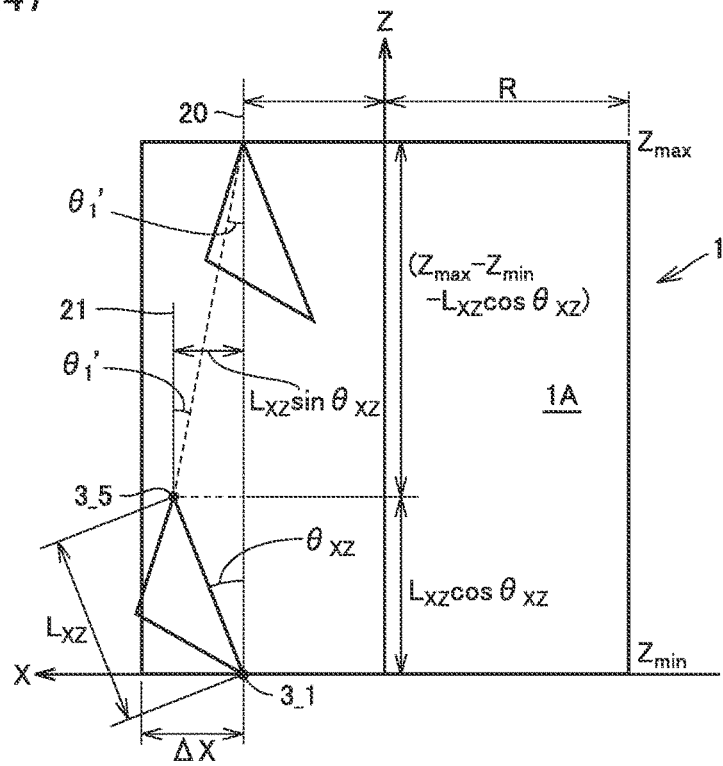
FIG. 47 is an XZ plane view for schematically illustrating the manufacturing method according to the second embodiment of the present invention.

FIG. 45 is an XY plane view for schematically illustrating the manufacturing method according to the second embodiment of the present invention. FIG. 46 is a YZ plane view for schematically illustrating the manufacturing method according to the second embodiment of the present invention. FIG. 47 is an XZ plane view for schematically illustrating the manufacturing method according to the second embodiment of the present invention.

As shown in FIGS. 45 to 47, in the embodiment of the present invention, the cutting start position is displaced by a correction amount $|\Delta X|$ on the X axis and by a correction amount $|\Delta Y|$ in the direction of the Y axis. The cutting start position at the time when a condition of $\Delta X=\Delta Y=0$ is satisfied corresponds to the cutting start position (R, 0, $Z_{min}$) at the time when a condition of $\theta_{XZ}=0°$ is satisfied. Correction amounts $\Delta X$ and $\Delta Y$ for the cutting start position can be expressed in expressions below.

$$\Delta X = -R(1 - \cos\theta_{XY}) \qquad (7)$$
$$\Delta Y = -R\sin\theta_{XY} \text{ where}$$

$$\tan\theta_{XY} = \frac{\tan\theta_{XZ}}{\tan\theta_{YZ}} = \frac{\tan\theta_{XZ}}{\tan\beta} \qquad (8)$$

According to FIGS. 46 and 47, a condition of $\beta>0$ and $\theta_{XZ}>0$ is satisfied. That is, a condition of $\theta_{XZ}>0$, $\Delta Y<0$, and $\Delta X<0$ is satisfied.

Then, cutting edge 2A is fed to machine rotation symmetry plane 1A. The coordinate (X, Y, Z) of tip end 3_1 of cutting edge 2A varies in accordance with program angles $\theta_1'$ and $\theta_2'$. The track has an amount of movement in directions of all of the X axis, the Y axis, and the Z axis. The direction of the track of the cutting edge is a direction transverse to each of the X axis, the Y axis, and the Z axis.

Cutting line 20 corresponds to the trace of a portion of cutting edge 2A in contact with rotation symmetry plane 1A. Cutting line 20 corresponds to a straight line connecting tip end 3_1 of cutting edge 2A at the cutting start position and rear end 3_5 of cutting edge 2A at the cutting end position to each other. Cutting line 20 is in parallel to the Z axis.

Cutting line 20 is displaced in the positive direction of the Y axis by ΔY from the Z axis on the YZ plane. Cutting line 20 is displaced in the positive direction of the X axis by ΔX from the Z axis on the XZ plane.

According to the second embodiment of the present invention, the cutting start position is moved by ΔY in the direction of the Y axis and is displaced by ΔX in the direction of the X axis. Program angles $\theta_1$ and $\theta_2$ are substituted with program angles $\theta_1{'}$ and $\theta_2{'}$. Thus, the machined surface can match with the designed surface in the XZ plane. Therefore, machine component 1 can accurately be manufactured. Furthermore, modification to a program for operating manufacturing apparatus 100 can be lessened.

The expressions (7) and (8) show that ΔX and ΔY will change based on tan β and tan $\theta_{XZ}$. The X axis coordinate and the Y axis coordinate of the cutting start position include ΔX and ΔY, respectively. Therefore, the X axis coordinate and the Y axis coordinate of the cutting start position are dependent on angle β and angle $\theta_{XZ}$, respectively. Thus, a machine component having a rotation symmetry plane defined by a generatrix in parallel to an axial line of rotation can highly accurately be machined.

Program angles $\theta_1{'}$ and $\theta_2{'}$ can be expressed as below.

$$\tan\theta_1' = \frac{L_{XZ}\sin\theta_{XZ}}{Z_{max} - Z_{min} - L_{XZ}\cos\theta_{XZ}} \quad (9)$$

$$\tan\theta_2' = \frac{L_{YZ}\sin\beta}{Z_{max} - Z_{min} - L_{YZ}\cos\beta} \quad (10)$$

A condition of $\theta_2{'}=\theta_2$ is satisfied. Program angle $\theta_1{'}$ is found as below. When tip end 3_1 of cutting edge 2A is positioned at the cutting start position, a height (a position in the direction of the Z axis) of rear end 3_5 of cutting edge 2A is expressed as $L_{XZ} \cos \theta_{XZ}$. A distance from cutting line 20 to rear end 3_5 of cutting edge 2A is expressed as $L_{XZ} \sin \theta_{XZ}$.

A virtual line 21 is a straight line which passes through rear end 3_5 of cutting edge 2A and is in parallel to cutting line 20 and the Z axis. Therefore, a distance between virtual line 21 and cutting line 20 is equal to $L_{XZ} \sin \theta_{XZ}$.

Program angle $\theta_1{'}$ is equal to an angle formed by the track of rear end 3_5 of cutting edge 2A on the XZ plane with respect to virtual line 21. Virtual line 21 is in parallel to cutting line 20. Therefore, program angle $\theta_1{'}$ is equal to an angle formed by the track of rear end 3_5 of cutting edge 2A on the XZ plane with respect to virtual line 21.

A triangle is formed by the track of rear end 3_5 of cutting edge 2A on the XZ plane, cutting line 20, and a normal extending from the position of rear end 3_5 of cutting edge 2A at the time of start of cutting down to cutting line 20. Relation of $\tan \theta_1{'}=L_{XZ} \sin \theta_{XZ}/(Z_{max}-Z_{min}-L_{XZ} \cos \theta_{XZ})$ is satisfied for this triangle.

(2) Results of Machining

Figure 48:
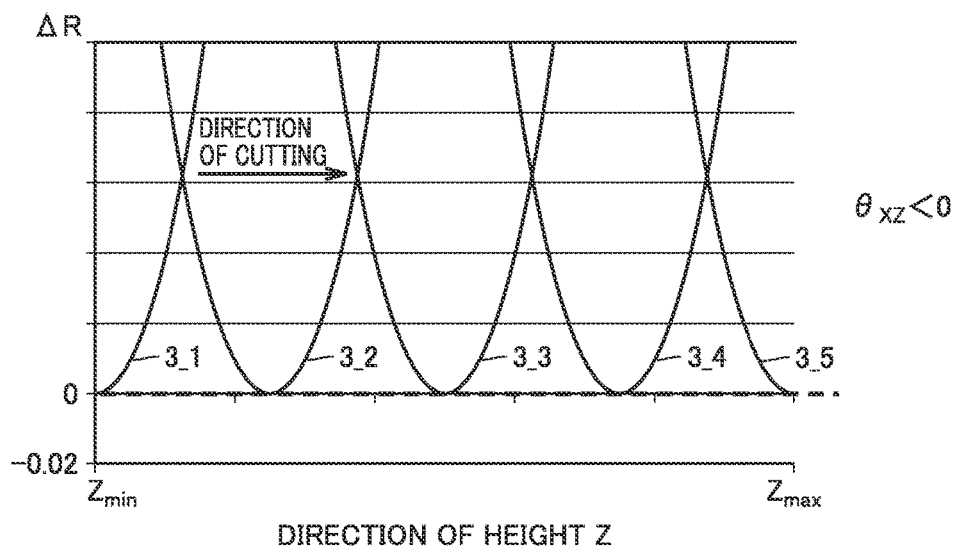
FIG. 48 is a diagram showing results of calculation of a machined shape on the RZ plane (corrected track) when the second inclination angle of the cutting edge is smaller than 0°.
Figure 49:
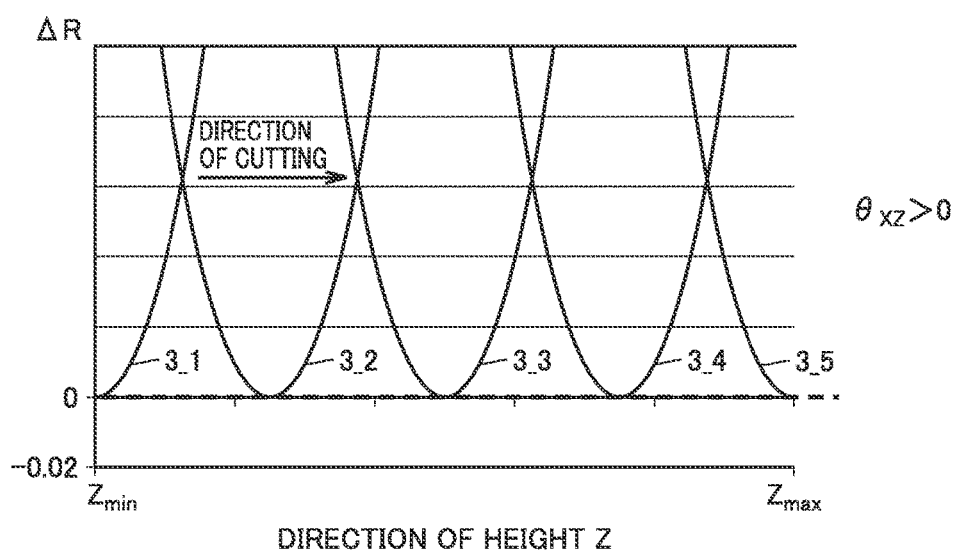
FIG. 49 is a diagram showing results of calculation of a machined shape on the RZ plane (corrected track) when the second inclination angle of the cutting edge is greater than 0°.

FIG. 48 is a diagram showing results of calculation of a machined shape on the RZ plane when second inclination angle $\theta_{XZ}$ of cutting edge 2A is smaller than 0°. FIG. 49 is a diagram showing results of calculation of a machined shape on the RZ plane when second inclination angle $\theta_{XZ}$ of cutting edge 2A is greater than 0°.

FIGS. 48 and 49 show traces of tip end 3_1, rear end 3_5, and regions 3_2, 3_3, and 3_4 of cutting edge 2A (see FIG. 12). In any of an example in which angle $\theta_{XZ}$ is smaller than 0° and an example in which angle $\theta_{XZ}$ is greater than 0°, ΔR can be maintained at 0 during a period from start of cutting until end of cutting. According to the second embodiment of the present invention, rotation symmetry plane 1A can be machined as designed.

(3) Manufacturing Method

Figure 50:
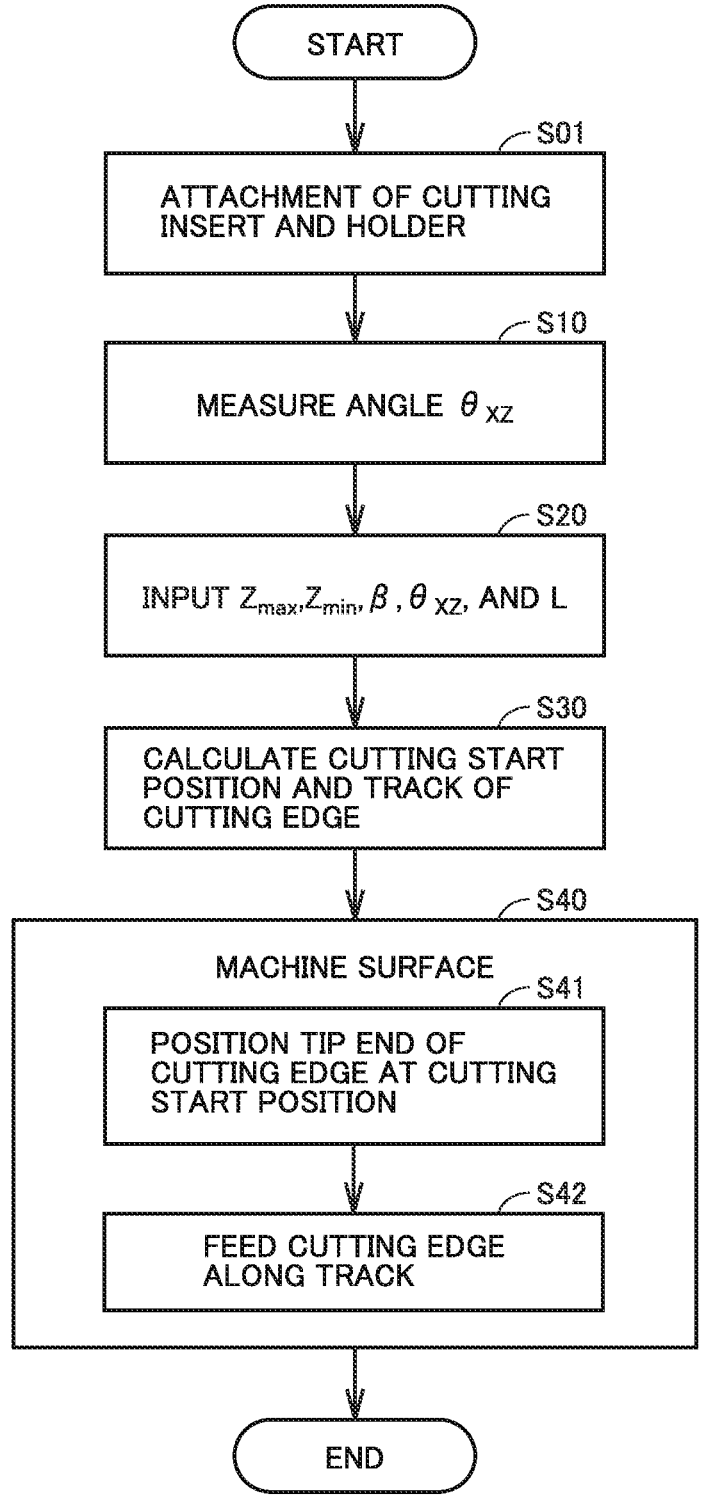
FIG. 50 is a flowchart showing the manufacturing method according to the second embodiment of the present invention.

FIG. 50 is a flowchart showing the manufacturing method according to the second embodiment of the present invention. Processing in each step shown in FIG. 50 is basically the same as processing in a corresponding step shown in FIG. 28. In step S01, cutting insert 2B is attached to holder 2. Holder 2 is attached to manufacturing apparatus 100 (feed mechanism 106).

In step S10, angle $\theta_{XZ}$ is measured. Since various known methods can be used for measuring angle $\theta_{XZ}$, detailed description will not be repeated here. For example, angle $\theta_{XZ}$ is measured with a measurement instrument such as a dial gauge or a presetter. Angle β is predetermined. Angle β, however, may be measured together with angle $\theta_{XZ}$.

Processing in steps S20 to S40 is performed as control unit 104 reads a program stored in storage unit 103. In step S20, control unit 104 controls display unit 102 to have the display unit show a screen inviting a user to enter a value necessary for machining rotation symmetry plane 1A. The user enters values for maximum value $Z_{max}$ of a Z axis coordinate of rotation symmetry plane 1A, minimum value $Z_{min}$ of the Z axis coordinate of rotation symmetry plane 1A, angle β, angle $\theta_{XZ}$, and length L into input unit 101 by operating input unit 101. Input unit 101 accepts the values. A value accepted by input unit 101 is stored, for example, in storage unit 103. A value accepted by input unit 101 may be stored in control unit 104 or in both of storage unit 103 and control unit 104.

In step S30, control unit 104 calculates the cutting start position and the track of cutting edge 2A. For example, operation unit 110 calculates ΔX, ΔY, tan $\theta_1{'}$, and tan $\theta_2{'}$ in accordance with the expressions (7) to (10). ΔX, ΔY, tan $\theta_1{'}$, and tan $\theta_2{'}$ are stored in storage unit 103. Depending on contents of a program, angle $\theta_1{'}$ and/or angle $\theta_2{'}$ may be stored in storage unit 103. Alternatively, a coordinate of a starting point of the track (cutting start position) and a coordinate of an end point of the track (cutting end position) may be stored in storage unit 103.

In step S40, rotation symmetry plane 1A is machined. Control unit 104 controls feed mechanism 106 by controlling drive unit 105. Thus, feed of holder 2 is controlled. Control unit 104 controls feed of cutting edge 2A.

Initially, control unit 104 positions tip end 3_1 of cutting edge 2A at the cutting start position (R+ΔX, ΔY, $Z_{min}$) (step S41). The X axis coordinate and the Y axis coordinate of the cutting start position are dependent on first inclination angle β and second inclination angle $\theta_{XZ}$. Therefore, step S41 can include positioning tip end 3_1 of cutting edge 2A such that the X axis coordinate and the Y axis coordinate of tip end 3_1 of cutting edge 2A are based on first inclination angle β and second inclination angle $\theta_{XZ}$.

Then, control unit 104 feeds cutting edge 2A such that the position of tip end 3_1 of cutting edge 2A is varied along the track (R+ΔX−t×tan $\theta_1{'}$, ΔY−t×tan $\theta_2{'}$, $Z_{min}$+t) (step S42). In step S42, control unit 104 moves cutting edge 2A such that tip end 3_1 of cutting edge 2A is located at a coordinate determined by variable t while variable t is varied from 0 to ($Z_{max}$−$Z_{min}$).

In machining for a second time and later, the processing in step S40 is repeated. Control unit 104 reads ΔX, ΔY, tan $\theta_1{'}$, and tan $\theta_2{'}$ from storage unit 103 and performs the processing in steps S41 and S42. While the same processing is repeated, control unit 104 may store ΔX, ΔY, tan $\theta_1{'}$, and tan $\theta_2{'}$.

According to the flow shown in FIG. 50, control unit 104 calculates ΔX, ΔY, tan θ$_1$', and tan θ$_2$' before the processing in step S40 and then calculates the cutting start position and the track. Control unit 104, however, may calculate correction amounts ΔX and ΔY in step S41 and may calculate tan θ$_1$' and tan θ$_2$' in step S42. The cutting start position and the track may be calculated in a step where they are necessary.

After step S40 or before step S01, a further step necessary for manufacturing machine component 1 may be performed. For example, after step S40, an inspection step for inspecting machine component 1 may be performed.

A computer which performs the processing in step S20 and step S30 is not limited to control unit 104 of manufacturing apparatus 100. A computer provided outside manufacturing apparatus 100 may perform the processing in step S20 and step S30. In this case, a step of receiving ΔX, ΔY, tan θ$_1$', and tan θ$_2$' can be added before step S40. For example, various known means such as an operation of input unit 101 by a user or transfer of data through a communication line can be applied to input of ΔX, ΔY, tan θ$_1$', and tan θ$_2$' to control unit 104.

When a condition of θ$_{XZ}$=0 is satisfied, a condition of θ$_1$'=0 and θ$_2$'=θ$_2$ is satisfied. Therefore, calculation of the cutting start position and the track based on the expressions (7) to (10) can include an example in which a condition of θ$_{XZ}$=0 is satisfied (see FIG. 35).

Axes defined as references for angles β, θ$_{YZ}$, and θ$_{XZ}$ may be set to the Y axis, the X axis, and the Z axis, respectively. An inclination angle with respect to one axis can be substituted with an inclination angle with respect to the other axis. In that case as well, the expression (7) to the expression (10) can be derived.

Directions of the X axis, the Y axis, and the Z axis are not limited as shown in each drawing. The positive direction of each of the X axis, the Y axis, and the Z axis may be opposite to the orientation shown in the drawings. The X axis, the Y axis, and the Z axis can also be interchanged.

Each embodiment of the present invention is applicable also to machining of a workpiece without being limited to a machine component.

It should be understood that the embodiments disclosed herein are illustrative and non-restrictive in every respect. The scope of the present invention is defined by the terms of the claims, rather than the embodiments above, and is intended to include any modifications within the scope and meaning equivalent to the terms of the claims.

REFERENCE SIGNS LIST 1 machine component; 1A rotation symmetry plane; 1B ridgeline (generatrix); 2 holder; 2A cutting edge; 2B cutting insert; 2C axis of rotation (holder); 3_1 tip end (cutting edge); 3_5 rear end (cutting edge); 3_2 to 3_4 region (cutting edge); 4_1, 4_5 trace; 10 axial line of rotation; 11 surface as designed; 20 cutting line; 100 manufacturing apparatus; 101 input unit; 102 display unit; 103 storage unit; 104 control unit; 105 drive unit; 106 feed mechanism; 110 operation unit; and S01, S10, S20, S30, S40, S41, S42 step

The invention claimed is:

1. A method for manufacturing a machine component having a rotation symmetry plane defined by a ridgeline inclined at an angle greater than 0° and smaller than 90° with respect to an axial line of rotation, the method comprising:

in a three-dimensional orthogonal coordinate system in which the axial line of rotation of the rotation symmetry plane is defined as a Z axis, an axis in a radial direction of the rotation symmetry plane is defined as an X axis, and an axis orthogonal to both of the Z axis and the X axis is defined as a Y axis, positioning a linear cutting edge inclined at an angle greater than 0° and smaller than 90° with respect to the Z axis at a cutting start position displaced from a position on the X axis along a direction of the Y axis; and machining the rotation symmetry plane by feeding the cutting edge from the cutting start position along a track having an X axis component, a Y axis component, and a Z axis component while the cutting edge is in contact with the rotating machine component.

2. The method for manufacturing a machine component according to claim 1, wherein
at the cutting start position, a first end portion of the cutting edge is in contact with the machine component, and
while the cutting edge is fed along the track from the cutting start position to a cutting end position, different portions of the cutting edge between the first end portion of the cutting edge and a second end portion of the cutting edge located opposite to the first end portion are successively in contact.

3. The method for manufacturing a machine component according to claim 1, the method further comprising calculating the cutting start position and the track from a length of the cutting edge, a first inclination angle formed by the cutting edge with respect to the X axis in an XZ plane, a second inclination angle formed by the cutting edge with respect to the X axis in an XY plane, a maximum radius of the rotation symmetry plane, a minimum radius of the rotation symmetry plane, and a target angle formed by the ridgeline with respect to the X axis in the XZ plane.

4. The method for manufacturing a machine component according to claim 3, wherein
a coordinate of the cutting start position is expressed as (X, Y, Z)=(R$_{max}$, ΔY, Z$_{min}$) and
the track is expressed as (X, Y, Z)=(Rm$_{max}$−t, ΔY−t×tan θ$_1$', Z$_{min}$+t×tan θ$_0$ '),
where R$_{max}$ represents the maximum radius of the rotation symmetry plane, R$_{min}$ represents the minimum radius of the rotation symmetry plane, t represents a variable varying from 0 to R$_{max}$−R$_{min}$, and θ$_s$ represents the target angle, and
ΔY, tan θ$_1$ ', and tan θ$_0$ ' satisfy expressions $$\Delta Y = R_{max}\sin\phi$$

$$\tan\theta'_1 = \tan(\phi + \gamma)$$

$$\tan\theta'_0 = \frac{\tan\theta_s}{\cos\phi - \sin\phi\tan\gamma}$$

$$\phi = \cos^{-1}\left(\cos\beta \times \frac{\tan\theta}{\tan\theta_s}\right) - \beta$$

$$\gamma = \tan^{-1}\left(\frac{L_{XY}\sin(\beta + \phi)}{R_{max} - R_{min} - L_{XY}\cos(\beta + \phi)}\right)$$

$$L_{XY} = L\sqrt{\frac{1 + \tan^2\beta}{1 + \tan^2\beta + \tan^2\theta}}$$

where L represents a length of the cutting edge, θ represents the first inclination angle, and β represents the second inclination angle.

5. The method for manufacturing a machine component according to claim 3, wherein
the cutting edge is held by a holder configured to prevent rotation of the cutting edge.

6. The method for manufacturing a machine component according to claim 3, the method further comprising measuring the first and second inclination angles with a measurement instrument.

7. An apparatus for manufacturing a machine component, with which the method for manufacturing a machine component according to claim 1 is performed.

* * * * *